(12) United States Patent
Tomlin

(10) Patent No.: US 11,467,970 B1
(45) Date of Patent: Oct. 11, 2022

(54) METADATA MANAGEMENT IN NON-VOLATILE MEMORY DEVICES USING IN-MEMORY JOURNAL

(71) Applicant: Kioxia Corporation, Tokyo (JP)

(72) Inventor: Andrew John Tomlin, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/393,087

(22) Filed: Aug. 3, 2021

(51) Int. Cl.
*G06F 12/00* (2006.01)
*G06F 12/0882* (2016.01)
*G06F 12/0817* (2016.01)
*G06F 12/02* (2006.01)

(52) U.S. Cl.
CPC ...... *G06F 12/0882* (2013.01); *G06F 12/0238* (2013.01); *G06F 12/0817* (2013.01); *G06F 2212/7201* (2013.01); *G06F 2212/7207* (2013.01)

(58) Field of Classification Search
CPC ............ G06F 12/0882; G06F 12/0238; G06F 12/0817; G06F 2212/7201; G06F 2212/7202
See application file for complete search history.

(56) References Cited

U.S. PATENT DOCUMENTS

| 10,108,658 | B1 | 10/2018 | Cole et al. |
| 2014/0281145 | A1* | 9/2014 | Tomlin ............... G06F 12/1081 711/103 |
| 2014/0325117 | A1 | 10/2014 | Canepa et al. |
| 2020/0073964 | A1 | 3/2020 | Levy et al. |
| 2021/0216508 | A1 | 7/2021 | Jose et al. |
| 2022/0121564 | A1 | 4/2022 | Battaje et al. |

OTHER PUBLICATIONS

Non-Final Office Action on U.S. Appl. No. 17/393,195 dated Jul. 25, 2022.

* cited by examiner

*Primary Examiner* — Gurtej Bansal
(74) *Attorney, Agent, or Firm* — Foley & Lardner LLP

(57) ABSTRACT

Various implementations described herein relate to systems and methods for managing metadata for an atomic write operation, including determining metadata for data, queuing the metadata in an atomic list, in response to determining that atomic commit has occurred, moving the metadata from the atomic list to write lookup lists based on logical information of the data, and determining one of metadata pages of a non-volatile memory for each of the write lookup lists based on the logical information.

20 Claims, 15 Drawing Sheets

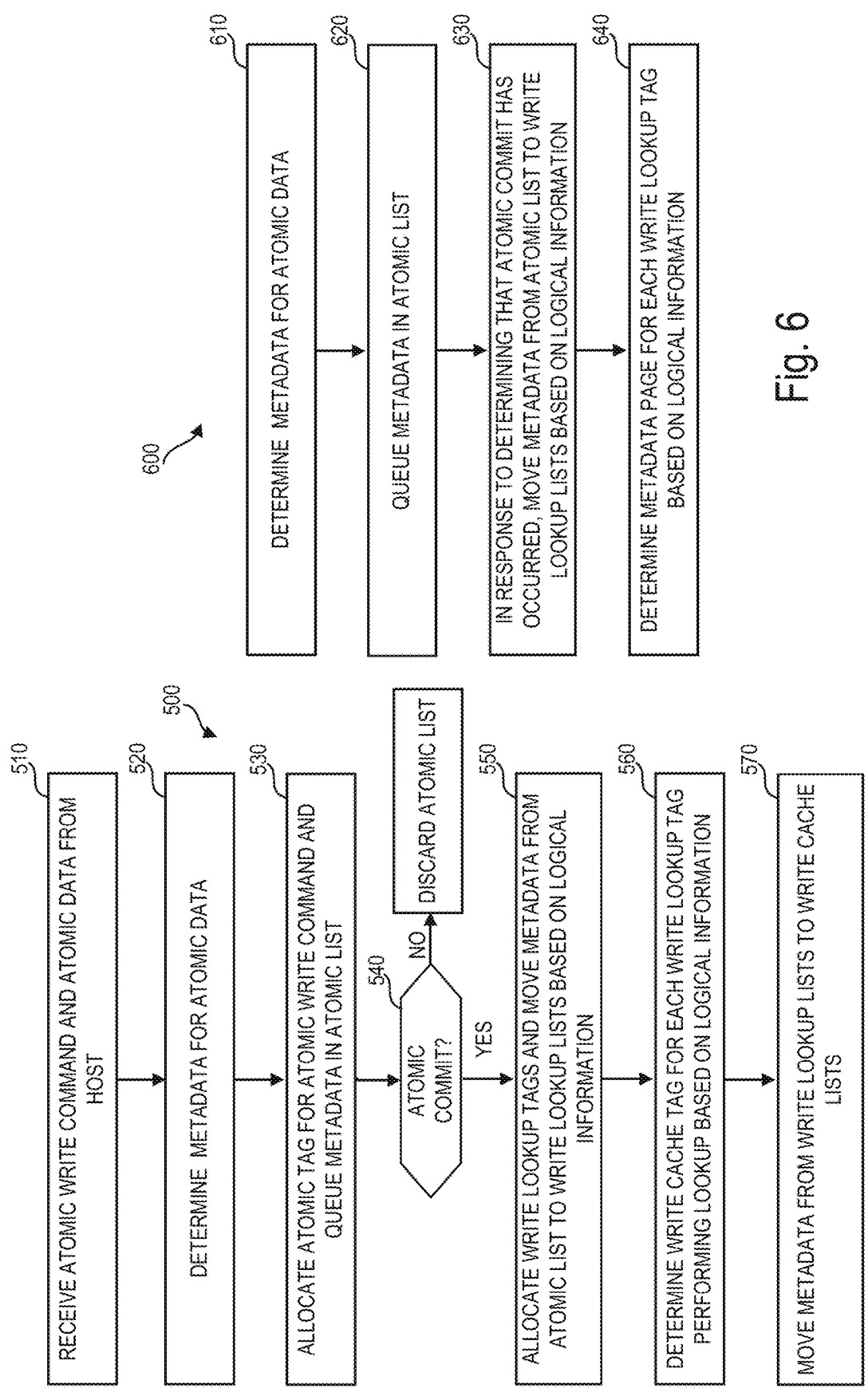

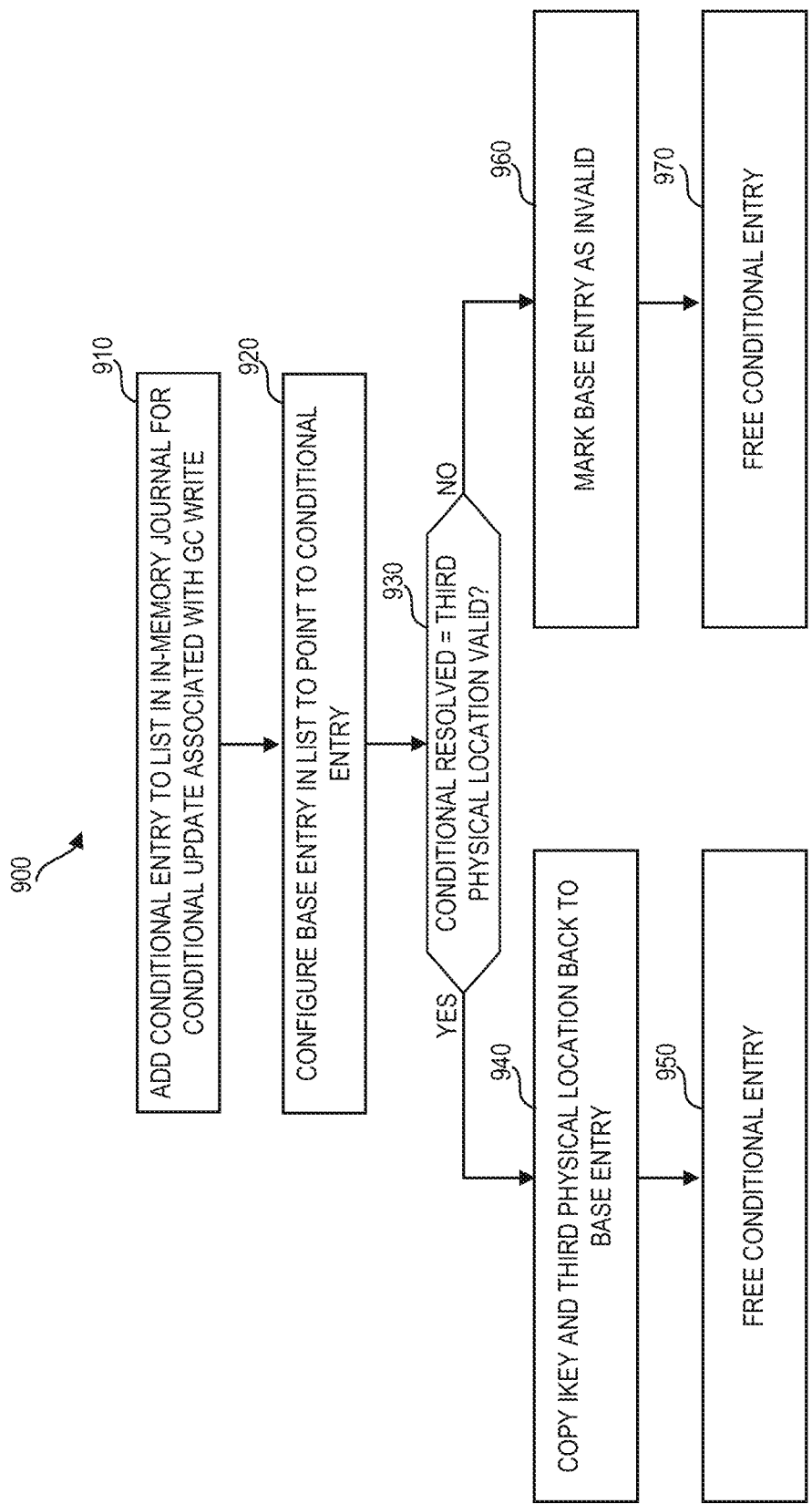

METADATA MANAGEMENT IN NON-VOLATILE MEMORY DEVICES USING IN-MEMORY JOURNAL

CROSS-REFERENCE TO RELATED APPLICATIONS

The present application is related to Ser. No. 17/393,155, titled "IN-MEMORY JOURNAL," filed Aug. 3, 2021, the content of which is herein incorporated by reference in its entirety. The present application is also related to Ser. No. 17/393,175, titled "METHOD FOR DISCARDING GARBAGE COLLECTION DATA DURING POWER LOSS," filed Aug. 3, 2021, the content of which is herein incorporated by reference in its entirety. The present application is related to Ser. No. 17/393,195, titled "CONDITIONAL UPDATE, DELAYED LOOKUP," filed Aug. 3, 2021, the content of which is herein incorporated by reference in its entirety.

TECHNICAL FIELD

The present disclosure generally relates to systems, methods, and non-transitory processor-readable media for metadata management in Non-Volatile Memory (NVM) devices.

BACKGROUND

A conventional Solid State Drive (SSD) receives write commands and associated data from a host and acknowledges the write commands to the host responsive to writing the data (also referred to as host data or user data) to a volatile storage or another suitable temporary buffer of the SSD. A controller of the SSD can write the data stored in the volatile storage to a NVM (e.g., flash memory such as NAND memory devices) of the SSD. Once writing the data to physical addresses of the NVM is complete, the controller (e.g., a Flash Translation Layer (FTL)) updates mapping between logical addresses associated with the data and the physical addresses identifying the physical locations, for example, in Logical to Physical (L2P) mapping information, an example of which is a L2P mapping table.

Metadata refers to information associated with the data that is generated or used by the SSD to facilitate and manage the processing (e.g., reading and writing) of the data. Examples of the metadata include but are not limited to, the L2P mapping information (e.g., the L2P mapping table) for the data, state information of the data, attribute information of the data, and so on.

In a non-paging SSD (having a non-paging FTL), all metadata can be stored in at least one Dynamic Random-Access Memory (DRAM) by the controller. In such an SSD and during the performance of a write command, new host data is written to the NVM, the map information is updated, and free space is accounted.

In a paging SSD (having a paging FTL), all metadata cannot be stored in the DRAM(s) of the controller, and some metadata is stored in the DRAM(s) while other metadata is stored in metadata pages in the NVM device. In other words, in response to a write or read command, pieces of the metadata have to be read (or "paged in") from the NVM device to be updated. In that regard, reading the metadata from the NVM device may incur expensive read latency for a read or write command. One technical issue is that write commands may be acknowledged without the metadata page being loaded.

In a paging FTL, updates to metadata are often made to a small fraction of a page. Tracking only the updates is more efficient than saving entire pages. Power fail schemes may rely on two basic operations to recover mapping information. The first scheme involves saving metadata prior to power being completely lost. This scheme requires capacitors or other power storage devices that can provide backup power after main power failure. The second scheme involves scanning user data blocks to reconstruct lost metadata upon restoration of power. While the first scheme is typically more robust and easier to test than the second scheme, the first scheme is more expensive in terms of hardware and has scale limitations. In particular, adding larger super-capacitors adds hardware cost, both in terms of extra component cost and additional board real estate. Thus, form factor and board space is often a significant limitation. Although scanning typically has a reduce cost in some situations, scanning also has significant limitations, including those in multi-stream devices.

An atomic write is a write operation that is performed completely, or if cannot be completely performed, then not performed at all. Atomic writes protect against partially completed (also known as "torn") writes, which cannot be completed due to a power failure or another type of interruption. Typically, atomic write operations can be implemented by buffering data, or alternatively, buffering metadata. Buffering data is known to be less efficient than buffering the metadata due to write amplification, free space accounting problems, and complexity.

SUMMARY

In some arrangements, a non-transitory computer-readable medium including computer readable instructions, such that when executed by at least one processor of a storage device, causes the processor to determine metadata for data, queue the metadata in an atomic list, in response to determining that atomic commit has occurred, move the metadata from the atomic list to write lookup lists based on logical information of the data, and determine one of metadata pages for each of the write lookup lists based on the logical information.

In some arrangements, the metadata includes mapping information that maps the logical information to physical locations of a non-volatile memory of the storage device, and the data is stored in the physical locations of the non-volatile memory.

In some arrangements, determining the metadata includes determining the physical locations using the logical information based on a Logical-to-Physical (L2P) mapping table.

In some arrangements, the processor is further caused to receive an atomic write command and the data associated with the atomic write command from a host, and determine whether the atomic commit has occurred.

In some arrangements, the processor is further caused to determine groups of the metadata using the logical information and move each group of the metadata to a corresponding one of the write lookup lists.

In some arrangements, the processor is further caused to move each group of the metadata from the one of the write lookup lists to a corresponding one of write cache lists, each of the write cache lists corresponds to one of metadata pages.

In some arrangements, the processor is further caused to move each group of the metadata from each of the write cache lists to the corresponding one of the metadata pages.

In some arrangements, the atomic list, the write lookup lists, and the write cache lists are stored in an in-memory journal.

In some arrangements, the atomic commit has been completed after all of the metadata is moved to the metadata pages.

In some arrangements, determining the one of metadata pages for each of the write lookup lists based on the logical information includes performing one lookup operation to determine the one of the metadata pages using the logical information of the metadata in each of the write lookup lists.

In some arrangements, storage device includes a non-volatile memory including data pages and metadata pages and a controller configured to determine metadata for data, queue the metadata in an atomic list, in response to determining that atomic commit has occurred, move the metadata from the atomic list to write lookup lists based on logical information of the data, and determine one of the metadata pages for each of the write lookup lists based on the logical information.

In some arrangements, the metadata includes mapping information that maps the logical information to physical locations of the data pages of the non-volatile memory of the storage device. The data is stored in the physical locations of the data pages.

In some arrangements, the controller is further caused to determine groups of the metadata using the logical information and move each group of the metadata to a corresponding one of the write lookup lists.

In some arrangements, the controller is further caused to move each group of the metadata from the one of the write lookup lists to a corresponding one of write cache lists, each of the write cache lists corresponds to one of metadata pages.

In some arrangements, the controller is further caused to move each group of the metadata from each of the write cache lists to the corresponding one of the metadata pages.

In some arrangements, the atomic list, the write lookup lists, and the write cache lists are stored in an in-memory journal.

In some arrangements, the atomic commit has been completed after all of the metadata is moved to the metadata pages.

In some arrangements, determining the one of metadata pages for each of the write lookup lists based on the logical information includes performing one lookup operation to determine the one of the metadata pages using the logical information of the metadata in each of the write lookup lists.

In some arrangements, a method includes determining metadata for data, queuing the metadata in an atomic list, in response to determining that atomic commit has occurred, moving the metadata from the atomic list to write lookup lists based on logical information of the data, and determining one of metadata pages of a non-volatile memory for each of the write lookup lists based on the logical information.

In some arrangements, the metadata includes mapping information that maps the logical information to physical locations of a non-volatile memory of the storage device, and the data is stored in the physical locations of the non-volatile memory.

BRIEF DESCRIPTION OF THE FIGURES

FIG. 5 is a flowchart diagram illustrating an example method for managing an atomic write operation using write lookup lists and write cache tag lists, according to various arrangements.

FIG. 6 is a flowchart diagram illustrating an example method for managing an atomic write operation using write lookup lists and write cache tag lists, according to various arrangements.

FIG. 9 is a flowchart diagram illustrating an example conditional update method using an in-memory journal, according to various arrangements.

DETAILED DESCRIPTION

Arrangements disclosed herein relate to systems, methods, and non-transitory computer-readable media for minimizing time needed to flush data in response to a power failure event and for minimizing scanning and time needed to ready a storage device upon power restore. That is, both capacitive holdup energy and time to ready relating to a power failure event can be reduced. In addition, arrangements disclosed herein allow early command completion, and loading of metadata pages from flash memory to complete host write commands is prevented. In other words, early command completion can be achieved without needing to read from and write to the flash memory. Such improvements can be achieved for a paging FTL by implementing an in-memory journal.

Figure 1:
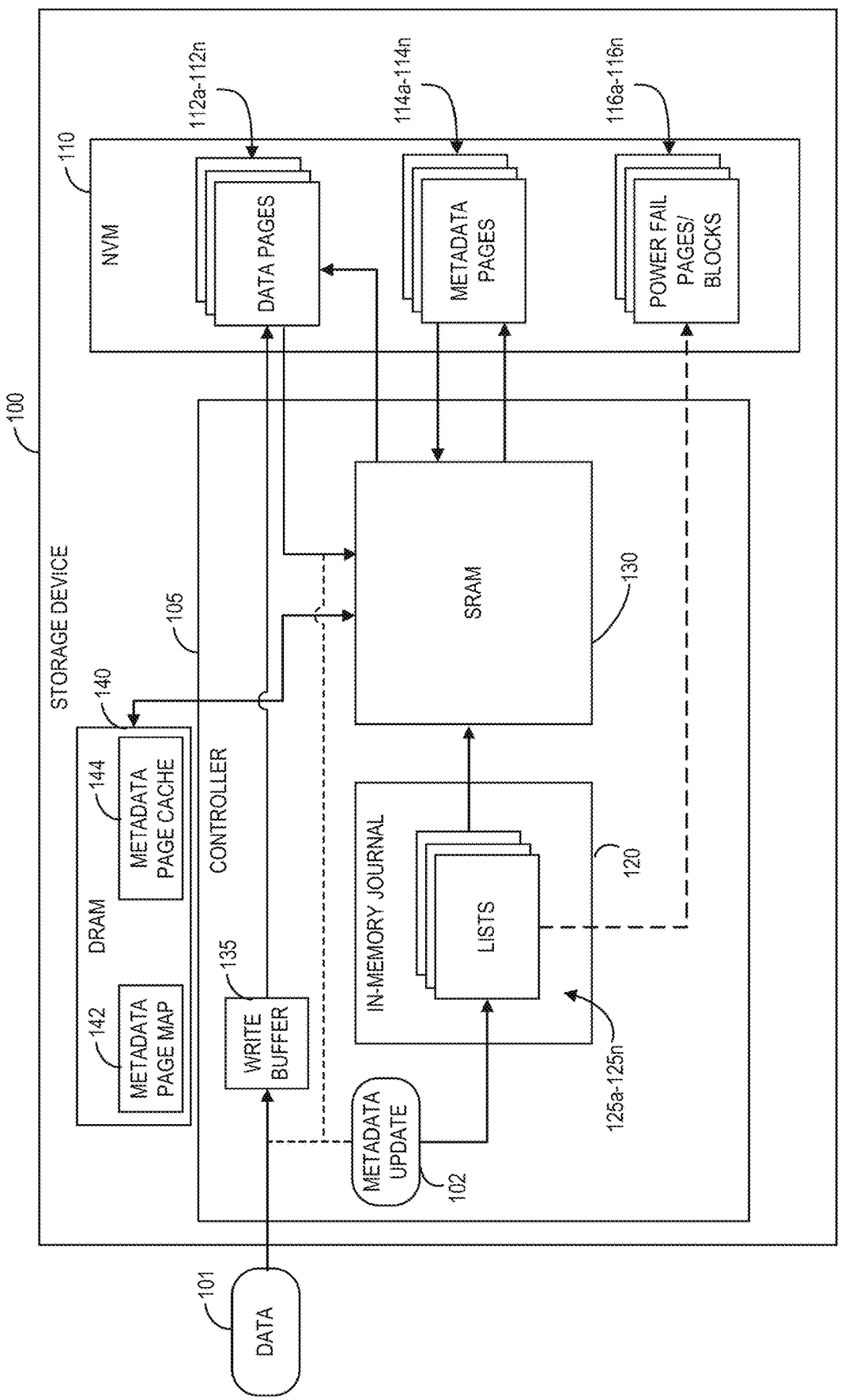
FIG. 1 is a schematic diagram illustrating an example mechanism for writing data to a storage device, updating metadata associated with the data, and preserving the metadata updates responsive to a power failure, according to various arrangements.

FIG. 1 is a block diagram illustrating an example mechanism for writing data to a storage device 100, updating metadata associated with the data, and preserving the metadata updates responsive to a power failure, according to various arrangements. As shown in FIG. 1, the storage device 100 includes an NVM 110. In one example, the NVM 110 includes NAND flash memory devices, each of which includes one or more dies. Each die has one or more planes. Each plane has multiple blocks, and each block has multiple pages. The NVM 110 has data pages 112a-112n, each of which is a page storing data received from a host (not shown). The NVM 110 also has metadata pages 114a-114n in the example in which the storage device 100 is a paging SSD. Each of the metadata pages 114a-114n is a page storing metadata such as but not limited to, the L2P mapping information (e.g., the L2P mapping table) for the data, state information of the data, attribute information of the data, and so on. The NVM 110 also has one or more power fail pages/blocks 116a-116n, which are pages or blocks in the NVM 110 reserved for any data or metadata to be flushed using backup power in the event of a power failure.

The storage device 100 includes a controller 105 for programming the data 101 to one or more of the data pages 112a-112n, determining the metadata update 102 (e.g., determining the L2P mapping information and other types of metadata) for the data 101 using a FTL, managing the in-memory journal 120, updating the metadata pages 114a-114n loaded in the SRAM 130, flushing the in-memory journal 120 to one or more of the power fail pages/blocks 116a-116n, and so on. The controller 105 uses the metadata page cache 144 to hold some of the metadata pages. These metadata pages may include metadata pages that have been updated and are not yet written to the NVM 110, as well as metadata pages already written. Some number of metadata pages may be in SRAM 130 for updating. The metadata page cache 144 holds only some of the entries in the complete Look-Up-Table (LUT), which is contained in the metadata pages 114a-114n in the NVM 140, in order to conserve space within the DRAM 140. The metadata page map 142 is contained in the DRAM 140 and is used to track metadata pages. As shown, the DRAM 140 is implemented using a memory device that is not on the chip implementing the controller 105, and the SRAM 130 is located on the chip, although in some arrangements both SRAM and DRAM may be located on the chip, or the controller configured as a multichip module which includes a DRAM die.

In a write operation, the data 101 (e.g., user data, host data, or so on) received from the host is first buffered in a write buffer 135, and is then stored in the NVM 110 (e.g., flash memory). The controller 105 generates the metadata update 102 (e.g., updated L2P mapping information, updated state information, and updated attribute information) for this write operation. Similarly, the controller 105 generates the metadata update 102 for GC operations, in which source data stored in the NVM (e.g., data pages 112a-112n) is copied from an original physical address (e.g., a page or pages in an original block) to a new physical address (e.g., a new page or pages in a new block). In that regard, the metadata update 102 for GC operations includes metadata that maps the logical address of the source data to the new physical address. Such metadata update 102 may replace existing metadata stored in one (e.g., the metadata page 114a) of the metadata pages 114a-114n that correspond to the same logical address of the data. The metadata update 102 updates some or all of the metadata related to the logical address of the data 101 (host data) or the source data stored in the data pages 112a-112n (for GC), which may constitute only a small fraction of the metadata page 114a. As shown, the metadata update 102 is buffered in the in-memory journal 120, on one of the list 125a-125n for the metadata page 114a. The in-memory journal 120 can be implemented using any suitable memory of the controller 105, including a SRAM (separate from the SRAM 130) or another suitable volatile or non-volatile memory device such as a PCM (Phase Change Memory) or MRAM (Magnetic RAM).

For example, the in-memory journal 120 allocates a write cache tag (WrCacheTag) prior to loading the metadata page 114a and uses the write cache tag to queue any metadata update 102 to the metadata page 114a while the metadata page 114a is being loaded. The write cache tag identifies the metadata page that contains the metadata for data 101 in the write buffer 135. The metadata includes fields such as the logical address and NVM address. The metadata updates 102 are maintained in order to ensure coherency. In particular, metadata updates 102 for the given metadata page 114a are maintained on a per metadata page list (e.g., the list 125a corresponding to the metadata page 114a), according to an update sequence order. For example, the list 125a stores metadata updates for the metadata page 114a, the list 125b stores metadata updates for the metadata page 114b, . . . , and the list 125n stores metadata updates for the metadata page 114n. New metadata update 102 for the metadata page 114a is added to the end of the list 125a. The list 125a is maintained even after the corresponding metadata page 114a is loaded to the SRAM 130 and updated. In response to determining that programing of updated metadata page 114a into the NVM 110 is successful, the list 125a corresponding to the metadata page 114a is cleared. That is, any one of the lists 125a-125n is only deleted in response to determining that the corresponding one of the metadata pages 114a-114n is written back to the NVM 110.

Such mechanisms improve power fail flushing because instead of flushing the metadata page 114a itself (which normally contains data that does not need to be updated, referred to as data other than the metadata update 102), the list 125a is flushed in response to power failure. That is, responsive to a power failure, those of the lists 125a-125n that are currently live (currently in use and not yet deleted) in the in-memory journal 120 are saved to the power fail pages/blocks 116a-116n in the NVM 110, without saving those of the metadata pages 114a-114n that are currently being updated (and in the paged metadata LUT) themselves. In some implementations, where in the in-memory journal 120 is implemented in a NVM, the saving/restoring of the in-memory journal 120 to/from separate power fail pages/blocks 116a-116n in NVM 110 may be omitted.

Responsive to power on restore, the in-memory journal 120 is restored by reading the in-memory journal 120 from the relevant power fail pages/blocks 116a-116n into the memory implementing the in-memory journal 120. Any metadata updates then listed in the lists 125a-125n can be replayed and applied to the metadata pages 114a-114n. Accordingly, the lists 125a-125n log uncommitted updates that have not been saved to the NVM 110 prior to power failure. This effectively reduces the metadata saved in response to a power failure to minimum such that only the differences (updates to the metadata pages 114a-114n) are saved given that a priori is the minimum amount of metadata can possibly be saved. Such mechanisms also reduce the time to ready the storage device after power failure, given that the lists merely need to be restored, and the storage device 100 can resume for where it left off before the power failure. In addition to the power failure/restore situations, the in-memory journal 120 can be likewise implemented to simplify or optimize for any low power or standby operations.

Figures 2, 3:
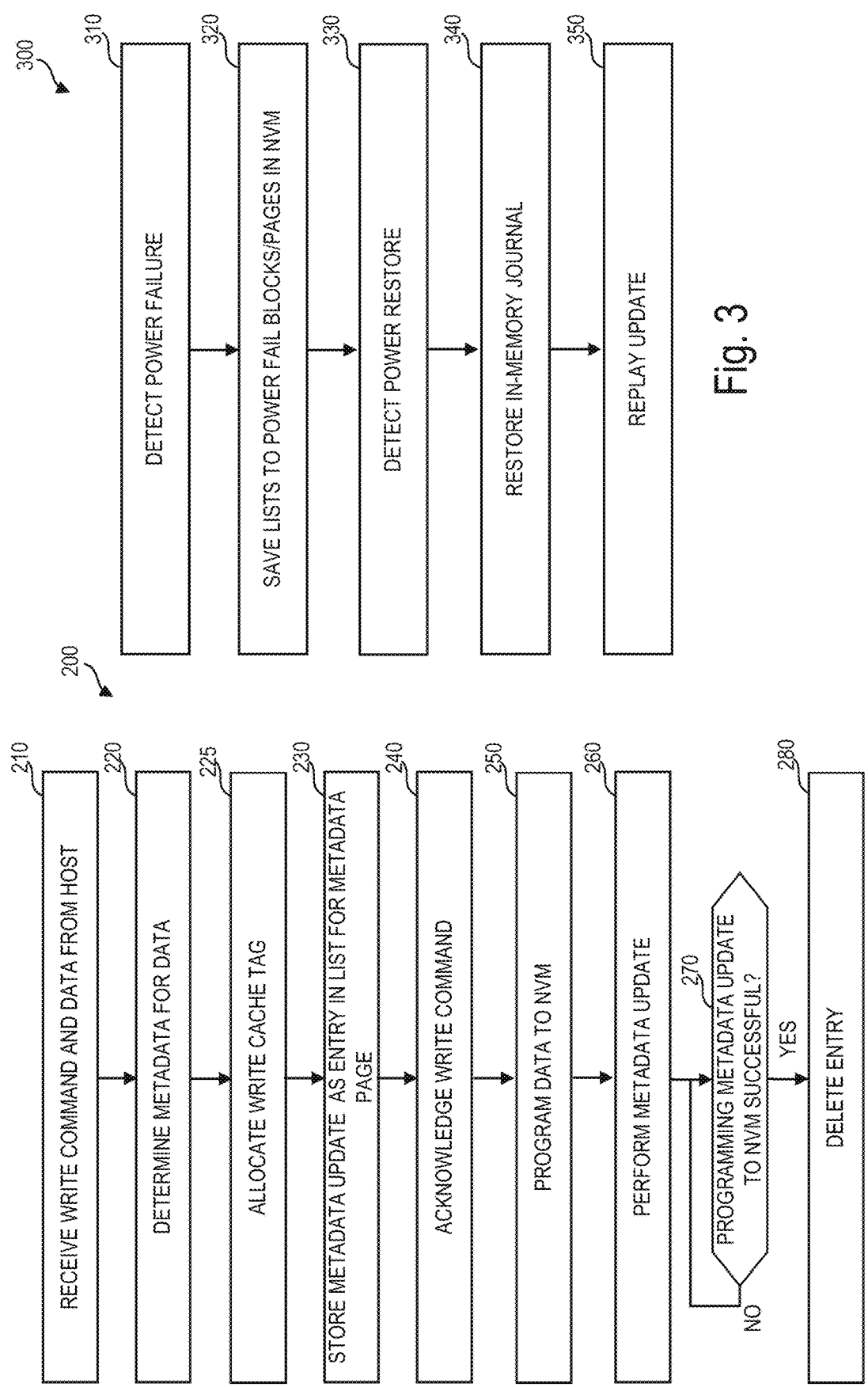
FIG. 2 is a flowchart diagram illustrating an example method of a write operation including metadata update using an in-memory journal, according to various arrangements.
FIG. 3 is a flowchart diagram illustrating an example method for performing power failure and restore operations using an in-memory journal, according to various arrangements.

FIG. 2 is a flowchart diagram illustrating an example method 200 of a write operation including metadata update using the in-memory journal, according to various arrangements. Referring to FIGS. 1-2, the method 200 can be performed by the controller 105.

At 210, the controller 105 receives a write command the data 101 associated with the write command from the host or another suitable entity. The write command identifies at least the logical address (e.g., an Logical Block Address (LBA)) associated with the data 101. In some examples, the data 101 is received in the write buffer 135, which can be a power-loss protected buffer. At 220, the controller 105 determines the metadata for the data 101. For example, the FTL of the controller 105 can determine a new physical address for the data 101 in the NVM 110 and maps the logical address associated with the data 101 to the new physical address. The updated L2P mapping (mapping the logical address to the new physical address) is an example of the metadata update 102. Other examples such as the time of write is another example of the metadata update 102. In other words, the controller 105 generates the metadata update 102 for the metadata page 114a.

At 225, the controller 105 allocates a write cache tag in response to determining the metadata at 220, in some implementations. At 230, the controller 105 stores the metadata update 102 as an entry in the list 125a for the metadata page 114a. As described herein, each of the lists 125a-125n stores metadata updates for a corresponding one of the metadata pages 114a-114n. Each of the metadata pages 114a-114n stores the metadata for one or more logical addresses, one or more physical addresses, one or more of the data pages 112a-112n, one or more blocks, one or more dies, or so on.

The entries in the list 125a are added according to the update order in which the data and the write commands are received 210. For example, metadata update for a write command and first data for a first logical address that is received prior in time (based on an associated order of receiving the same) is added to the end of the list 125a, and metadata update for a subsequent write command and second data for a second logical address that is received later in time (based on an associated timestamp) is added to the end of the list 125a later. In the example in which the first and second logical addresses are the same, an overlap write occurs. In that regard, the metadata for the subsequently received second data is updated after the metadata for the previously received first data has been updated, thus assuring data coherence in overlapping writes.

At 230, the controller 105 acknowledges the write command to the host by, for example, sending an acknowledgement message to the host. In some arrangements, the controller 105 acknowledges the write command signaling that the write operation is complete to the host, in response to determining that the data 101 is safely stored in the power-loss protected buffer (e.g., the write buffer 135) at 210 and that the metadata update 102 is stored as an entry in the appropriate list 125a in the in-memory journal 120 at 230.

At 250, the controller 105 programs the data 101 to the NVM 110. In particular, the controller 105 can program the data 101 to the physical address determined by the FTL to one or more of the data pages 112a-112n. In some examples, 250 can be performed in response to the FTL determining the physical address, and can be performed simultaneously with one or more of 230, 240, and 260.

At 260, the controller 105 performs metadata update. For example, the controller 105 reads the metadata page 114a that contains the metadata that needs to be updated into the SRAM 130 and programs the updated metadata page 114a with the metadata update 102 along with the rest of the unchanged metadata information on the metadata page 114a into the NVM 110, as the updated metadata page 114a. The metadata page map 142 contains the location of updated metadata page 114a for a given logical address. As described, write cache tag is allocated in step 225, the in-memory journal 120 uses this write cache tag prior to reading the metadata page 114a into the paged metadata 130 and uses the write cache tag to queue any metadata update 102 to the metadata page 114a before, during and after the metadata page 114a is being read and loaded. In some examples, 260 can be performed in response to the metadata update 102 is stored in the list 125a at 230, and can be performed simultaneously with one or more of 240 and 250.

At 270, the controller 105 determines whether programming the metadata update to the NVM 110 at 260 has been successful. In response to determining that programming the metadata update to the NVM 110 is not yet successful (270:NO), the method 200 returns to 270. On the other hand, in response to determining that programming the metadata update to the NVM 110 is successful (270:YES), the controller 105 at 208 deletes all entries on the list 125a including the entry corresponding to the metadata update 102.

This data 101 that is written in this manner is coherent for any read operations, as the read operation needs the most up-to-date metadata page 114a to be loaded from the NVM 110 into the SRAM 130 and updated. During the metadata load process, the metadata updates from any previous write operations are completed before address lookup for the reads occurs. In that regard, the controller 105 may check the list 125a for any metadata updates for the metadata page 114a that still needs to be performed.

FIG. 3 is a flowchart diagram illustrating an example method 300 for performing power failure and restore operations using the in-memory journal 120, according to various arrangements. Referring to FIGS. 1-3, the method 300 can be performed by the controller 105.

At 310, the controller 105 detects power failure using any suitable mechanism. In particular, the controller 105 can receive a power failure signal from a primary power supply. At 320, the controller 105 saves the in-memory journal 120, including the lists 125a-125n that are currently live (currently in use and not yet deleted) to the power fail pages/blocks 116a-116n in the NVM 110, without saving those of the metadata pages 114a-114n that are currently being updated (and in the paged metadata LUT).

At 330, the controller 105 detects power restore. At 340, the controller 105 restores the in-memory journal 120 by reading the in-memory journal 120 from the power fail pages/blocks 116a-116n into the memory implementing the in-memory journal 120. At 350, the controller 105 replays any metadata updates then listed in the lists 125a-125n. In particular, the controller 105 continues to program the metadata updates then listed in the lists 125a-125n to the metadata pages 114a-114n, in the manner described with respect to 260.

In-memory journals improves not only power failure/restore operations, but also atomic writes and conditional updates for a paging SSD. As described herein, in a paged system, metadata updates can be queued using the in-memory journal to allow early command completion. For coherency reasons, the metadata updates need to be queued against appropriate write cache tags. With respect to atomic writes, the metadata updates cannot be queued on write cache tags until the decision to commit the data atomically (to complete the atomic write operation as a whole) is made, due to system efficiency considerations. One solution may be determining the correct write cache tag as the data is received. However, in such solution, while on the atomic list, extra information identifying the appropriate write cache tag has to be stored. This results in a more cumbersome implementation due to storing of this extra information while on the atomic list. In addition, each entry in the atomic list would need to be looked up independently, resulting in additional processing.

Figure 4:
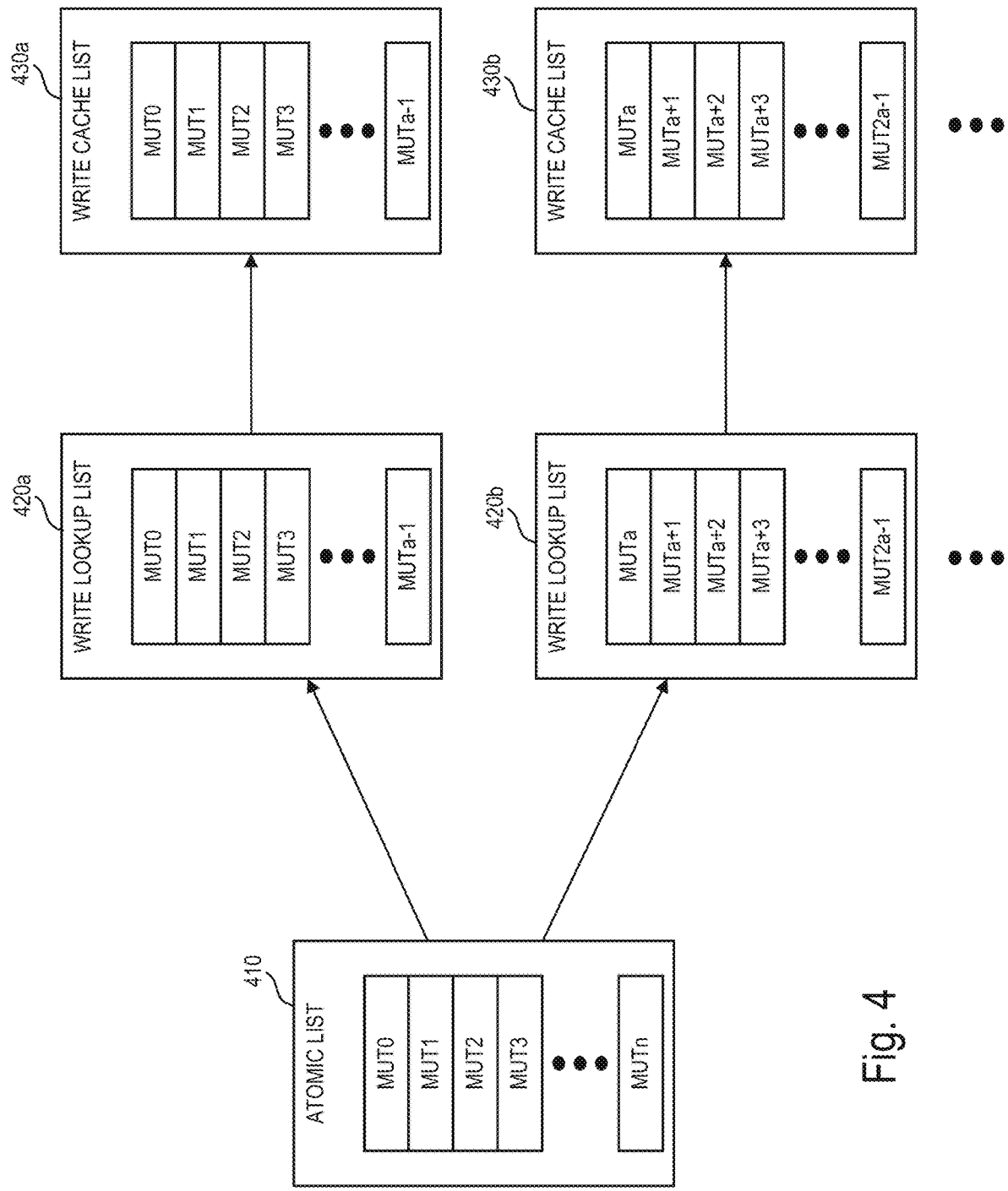
FIG. 4 is a schematic diagram illustrating an example of managing an atomic write operation using write lookup lists and write cache tag lists, according to various arrangements.

FIG. 4 is a schematic diagram illustrating an example of managing an atomic write operation using write lookup lists and write cache tag lists, according to various arrangements. FIG. 5 is a flowchart diagram illustrating an example method 500 for managing an atomic write operation using write lookup lists and write cache tag lists, according to various arrangements. Referring to FIGS. 1-5, the mechanism shown in FIG. 4 and the corresponding method 500 allows storing of metadata corresponding to atomic data on an atomic list 410 before the atomic write is committed, and then re-queuing the metadata during lookups using write lookup tags (e.g., WrLookup tags) and write lookup lists 420a and 420b. A write lookup list stores all the entries of metadata corresponding to a same metadata page. This results in only one lookup operation for all entries sharing the same destination metadata page. Each of the write lookup lists 420a and 420b, the write cache lists 430a and 430b are examples of the lists 125a-125n in the in-memory journal 120.

At 510, the controller 105 of the storage device 100 receives an atomic write command and atomic data (e.g., the data 101) associated with the atomic write command from the host or another suitable entity. The atomic write command identifies at least the logical addresses (e.g., LBAs) associated with the atomic data. In some examples, the atomic data is received in the write buffer 135, which can be a power-loss protected buffer.

At 520, the controller 105 determines the metadata for the atomic data. For example, the FTL of the controller 105 can determine a new physical address for each logical address of the atomic data in the NVM 110 and maps the logical addresses associated with the atomic data to the new physical addresses. The updated L2P mapping (mapping the logical addresses to the new physical addresses) is an example of the metadata or metadata update 102. In other words, the controller 105 generates the metadata update 102 for the metadata pages 114a-114n. In one example, the metadata generated for the atomic data includes multiple (e.g., n+1) Mappable Units (MUTs), each of which is identified using an index number 0–n. In one example, each MUT corresponds to a piece (e.g., one or more LBAs) of the atomic data.

At 530, the controller 105 allocates an atomic tag for the atomic write command and queues the metadata in the atomic list 410. The same atomic tag is allocated in frontend logic for all pieces of the atomic data associated with the atomic command. The atomic tag can be allocated as the atomic data is being received piece-wise at 510 and/or while the metadata is determined at 520. As shown, the atomic list 410 is stored in the in-memory journal 120 and includes all MUTs, MUT0-MUTn. All MUT writes associated with the atomic write command carry the same atomic tag. In other words, each entry in the same atomic list 410 corresponds to the same atomic tag, with one atomic tag allocated for each atomic command.

To minimize memory needed for the atomic list 410, the metadata in the atomic list 410 is not yet associated with any metadata pages 114a-114n. Although a lookup can be performed for every entry (e.g., every MUT) in the atomic list 410 upon arrival, such extra information needs to be stored on the atomic list 410, thus consuming additional memory. This would also mean that every entry needs an individual lookup operation.

At 540, the controller 105 determines whether atomic commit has occurred. An atomic commit refers to committing to store all of the atomic data received at 510, and considers the power cycle of the storage device 100, among other factors. In response to determining that no atomic commit has occurred (540:NO), at 580, all records in the atomic list 410 are discarded (e.g., after preforming a free space accounting if needed), and the method 500 ends. On the other hand, in response to determining that atomic commit has occurred (540:YES), at 550, the controller 105 allocates write lookup tags and moves the metadata from the atomic list 410 to the write lookup lists 420a and 420b based on logical information.

Although the metadata pages corresponding to the entries listed in the atomic list 410 are unknown because lookup has not occurred at this point to conserve memory for the atomic list 410, the metadata in the atomic list 410 can be grouped such that each group of metadata (one or more MUTs) corresponds to one of the metadata pages 114a-114n. A write lookup tag is allocated for each group, and each group of metadata is moved from the atomic list 410 to a write lookup list corresponding to the as yet unknown but shared, write lookup tag. In one example, each of the metadata pages 114a-114n can store a predetermined amount of metadata (e.g., 10 MUTs), denoted as a (e.g., a=10). Assuming that 2000 MUTs was generated for the atomic data received at 510, it can be determined that 200 write cache tags (and write cache lists) are allocated. For the sake of clarity, two write cache lists 420a and 420b are shown for illustrative purposes.

In other words, each write lookup tag or write lookup list is specific to a given (but unknown) metadata page physical location, metadata page index, metadata page identifier, and/or metadata page number, and write cache tag. The grouping of metadata (of the MUTs0-n) onto the same write lookup tag or write lookup list is mathematically calculable based on the logical location or information corresponding to the metadata. In one example, given that it is known that each of the metadata pages 114a-114n can store a MUTs, and the logical information can be used to calculate the alignment within the metadata page. Assuming, in this example, that alignment matches exactly the command, the first a MUTs of the atomic list 410 (MUT0-MUTa−1) is associated with a first write lookup tag and the write lookup list 420a, and the second a MUTs of the atomic list 410 (MUTa-MUT2a−1) is associated with a second write lookup tag and the write lookup list 420b, and so on. If the alignment does not match, then less than a MUT's would be in the first write lookup list 420a Accordingly, if an atomic write spans several metadata pages, each segment is assigned a different write lookup tag. Each group of metadata in the atomic list 410 is moved to the associated write lookup lists 420a and 420b.

At 560, the controller 105 determines a write cache tag for each write lookup tag and for each write lookup list performing lookup based on logical information of the metadata associated with each write lookup tag and in each write lookup list. In some arrangements, the controller 105 issues each write lookup tag with appropriate logical information and translates the logical information to a metadata page physical location, metadata page index, metadata page identifier, and/or metadata page number, and write cache tag. The controller 105 can look up the information and perform write cache tag allocation if needed using various data structures including metadata page map 142 or another suitable table that maps logical addresses to physical locations, indexes, identifiers and/or numbers of the metadata pages 114a-114n. The controller 105 can use one or more logical addresses (e.g., LBAs) in the MUTs for each write lookup list as inputs to the lookup process and obtains a corresponding physical location, index, identifier, number, write cache tag of one of the metadata pages 114a-114n The logical address(es) used can be the logical address of the first MUT in each write lookup list, the last MUT in each write lookup list, any other MUT in each write lookup list. The logical addresses to physical locations, indexes, identifiers, numbers and write cache tag of the metadata pages 114a-114n determined using the available data structures are returned with their corresponding write lookup tags.

At 570, the controller 105 uses the allocated the write cache tags and moves the metadata from the write lookup lists 420a-420b to the write cache lists 430a and 430b. Each write lookup list corresponds to one write cache tag, and metadata page. In other words, each write lookup list (write lookup tag) corresponds to a given write cache list and a given metadata page. The number (e.g., 200) of write lookup tags (and write lookup lists) is less than the number of write cache tags (and write cache lists), and is sized to keep the lookup process busy. The write cache tag is determined by the lookup operation at 560. The metadata in each of the write lookup list is then moved from the write lookup list to a corresponding write cache list. For example, MUT0-MUTa–1 are moved from the write lookup list 420a to the write cache list 430a, and MUTa-MUT2a–1 are moved from the write lookup list 420b to the write cache list 430b. Once all the metadata from all the write lookup lists 420a-420b are moved to the write cache lists 430a-430b, atomic commit has been completed. This process does not include reading from the NVM 110 to complete the atomic commit.

Accordingly, in the method 500, only one metadata page lookup is performed per metadata page, thus eliminating the need to store metadata information prior to atomic commit and reducing the number of lookup operations because lookup is performed per metadata page instead of per MUT. The method 500 is relatively fast and atomic command completion is acknowledged once all metadata has been moved onto write cache lists.

FIG. 6 is a flowchart diagram illustrating an example method 600 for managing an atomic write operation using write lookup lists and write cache tag lists, according to various arrangements. Referring to FIGS. 1-6, the method 600 is similar to the method 500 and corresponds to the mechanism shown in FIG. 4. The controller 105 receives an atomic write command and the data associated with the atomic write command from a host.

At 610, the controller 105 determines the metadata for the data. The metadata includes mapping information that maps the logical information to physical locations of the NVM 110. The data is stored in the physical locations of the data pages 112a-112n of the NVM 110. In some arrangements, determining the metadata includes determining the physical locations using the logical information using a L2P mapping table.

At 620, the controller 105 queues the metadata in the atomic list 410. The controller 105 determines whether the atomic commit has occurred. At 630, in response to determining that atomic commit has occurred, the controller 105 moves the metadata from the atomic list 410 to write lookup lists 420a and 420b based on logical information of the data. In some arrangements, the controller 105 determines groups of the metadata using the logical information. Each group of the metadata is moved to a corresponding one of the write lookup lists 420a and 420b.

At 640, the controller 105 determines one of the metadata pages 114a-114n for each of the write lookup lists 420a and 420b based on the logical information. Each group of the metadata from the one of the write lookup lists 420a and 420b is moved to a corresponding one of write cache lists 430a and 430b, each of the write cache lists corresponds 430a and 430b to one of metadata pages 114a-114n. The controller 105 moves each group of the metadata from each of the write cache lists 430a and 430b to the corresponding one of the metadata pages 114a-114n. In some arrangements, determining the one of metadata pages for each of the write lookup lists 420a and 420b based on the logical information includes performing one lookup operation to determine the one of the metadata pages 114a-114n using the logical information of the metadata in each of the write lookup lists 420a and 420b.

The atomic list 410, the write lookup lists 420a and 420b, and the write cache lists 430a and 430b are stored in the in-memory journal 120. The atomic commit has been completed after all of the metadata is moved to the write cache tag lists 430a-430b.

In the storage device 100, NVM 110 is programmed in the unit of a page and erased in the unit of a block, where a block includes multiple pages. Data on certain pages of a block may be updated to another location on another block, leaving some pages in the block valid and other pages in the block invalid. To free up blocks for future writes, valid pages of the block may be read and written to pages in other blocks (referred to as a Garbage Collection (GC) write), and the block as a whole can be erased to be used for future writes. To allow coherence between host writes (data received from the host to be programmed to the NVM 110) and GC writes, physical mapped buffers and conditional updates have been used. The GC data (data to be written in a GC process) is associated with an original source physical location along with its new physical location. This original location is used as a key to determine if the GC was valid during the update process.

In some arrangements, conditional updates from Garbage Collection (GC) can also be buffered through the in-memory journal 120. The conditional updates present an issue that extra space is needed prior to conditional resolution. For example, this conditional information can grow the size of the record and is only transient in life. A simple solution may be enlarging the sizes of the entries, which may be undesirable as it results in a more cumbersome implementation and is less efficient because this extra information is added to each entry.

In some arrangements, given that in a life cycle of an entry, the time prior to conditional resolution is short, a second entry can be allocated as a "leaf" to the main single linked list to store transient information. In response to resolving the conditional, this leaf entry can be deallocated. In other words, two entries or records are allocated, creating an extra link for additional information. Once the conditional is resolved either way, the extra entry can be deallocated, and the original entry is updated appropriately. This also allows the lists to remain single linked for additional memory saving.

Figure 7:
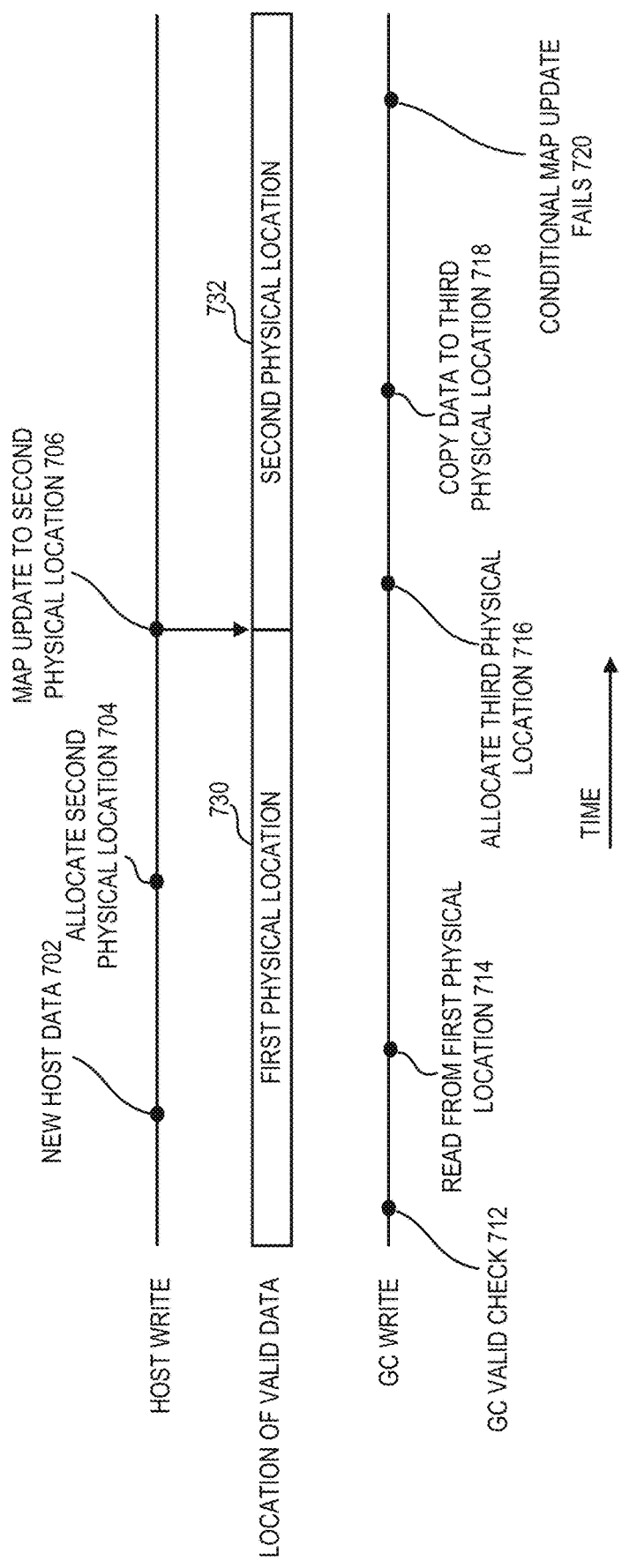
FIG. 7 is a schematic diagram illustrating a conditional update mechanism, according to various arrangements.

FIG. 7 is a schematic diagram illustrating a conditional update mechanism, according to various arrangements. Referring to FIGS. 1, 2, and 7, a conditional update can be performed by the controller 105. In FIG. 7, processes and operations related to a host write concerning a logical address, processes and operations related to a GC write concerning the same logical address, and the physical location of the valid data corresponding to the logical address is shown. Processes and operations shown to the right occur later than processes and operations shown to the left.

The location of the valid data corresponding to the logical address is originally stored at the first physical location 730 of the NVM 110. With regard to the host write, the controller 105 receives new host data corresponding to the logical address at 702. In response, the controller 105 (e.g., the FTL) allocates the second physical location 732 of the NVM 110 for the new data, at 704. The new data is programmed to the second physical location 732. At 706, the controller 105 performs unconditional map update to update the valid logical location of the data corresponding to the logical address from the first physical location 730 to the second physical location 732. From that point on, the valid physical location is at the second physical location 732. The map update can be performed using the in-memory journal 120 as described. For example, updates to mapping (logical address mapped to the second physical location 732) is saved as an entry to one of the lists 125a-125n.

With regard to the GC write, at 712, the controller 105 performs a GC validity check. At 714, the controller 105 reads the data from the first physical location 730. At 716, the controller 105 (e.g., the FTL) allocates a third physical location of the NVM 110 different from the second physical location 732. At 718, the controller 718 copies the data read at 714 to the third physical location. At 720, the conditional map update fails given that the valid location for the data has been updated to the second physical location 732 unconditionally by the host write. Although the new data has been programmed to the second physical location 732 and the old data has been programmed to the third physical location, only the second physical location 732 is valid for the logical address corresponding to the data.

Figure 8A:
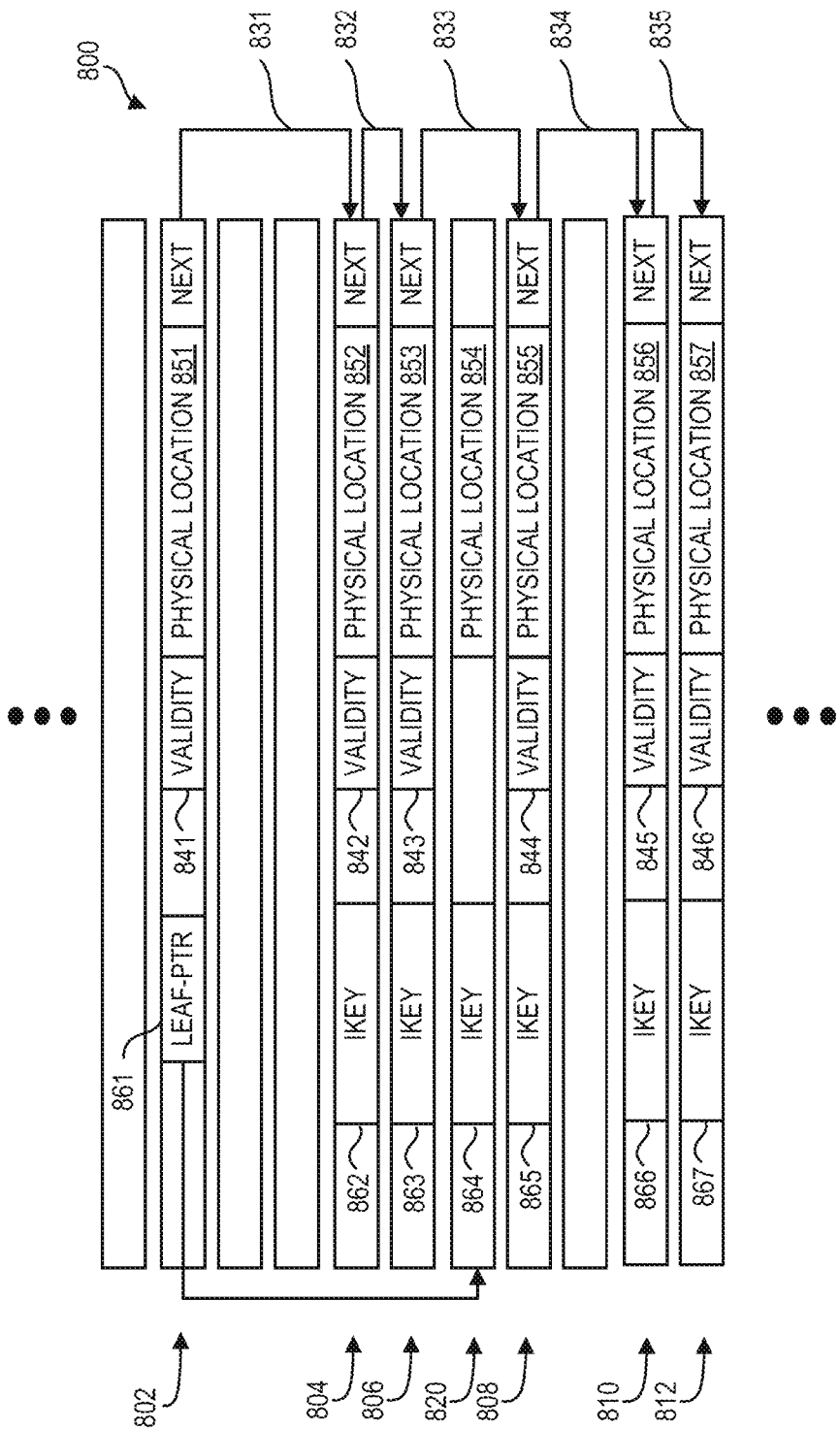
FIGS. 8A, 8B, and 8C are schematic diagrams illustrating conditional update using an in-memory journal, according to various arrangements.
Figure 8B:
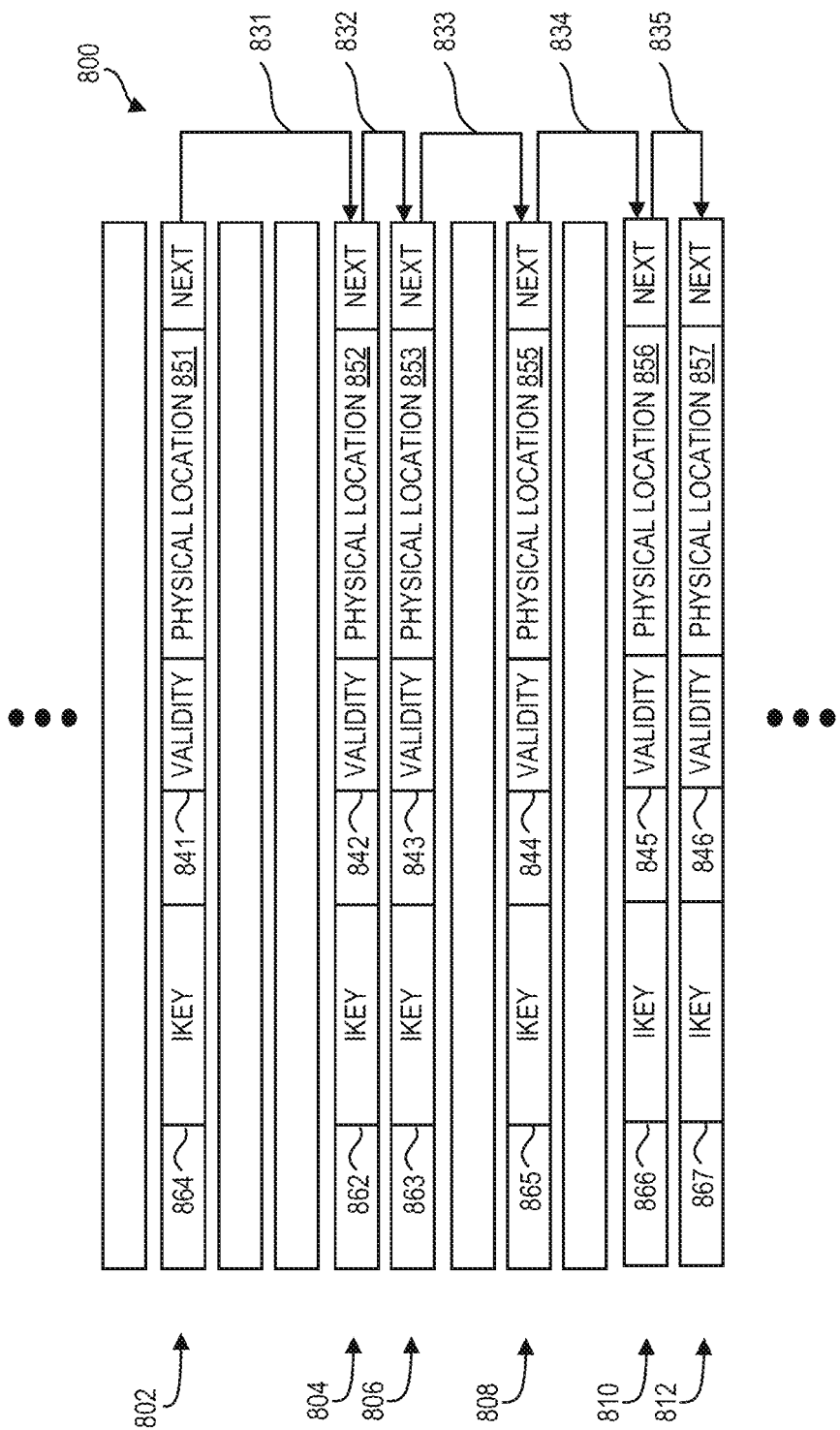
Figure 8C:
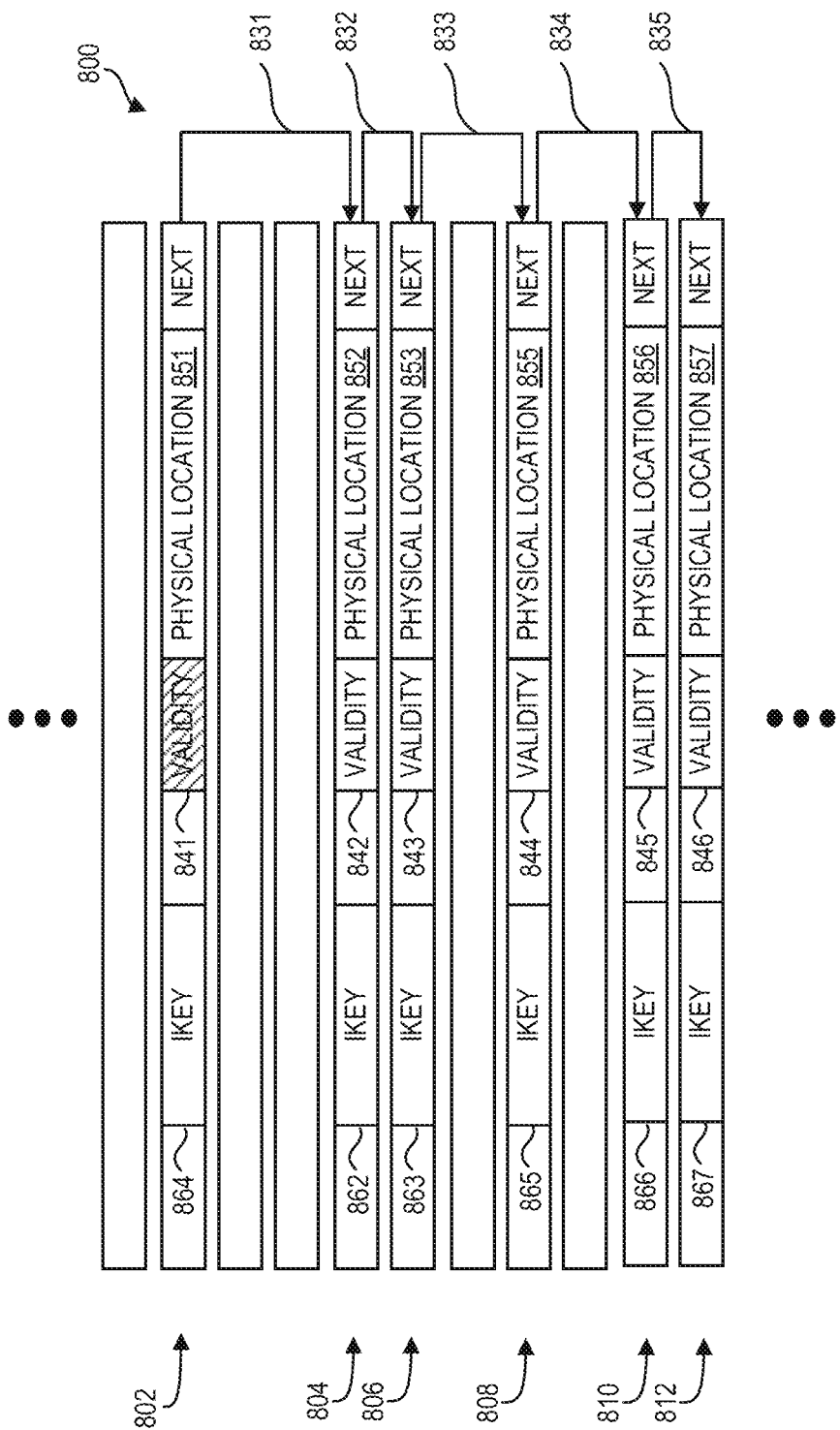

FIGS. 8A, 8B, and 8C are schematic diagrams illustrating conditional update using an in-memory journal, according to various arrangements. Each of the FIGS. 8A, 8B and 8C illustrates a list 800 of the in-memory journal 120. FIG. 9 is a flowchart diagram illustrating an example conditional update method 900 using an in-memory journal, according to various arrangements. Referring to FIGS. 1, 2, 7, 8A-8C, and 9, the list 800 is a single linked list that can be one of the lists 125a-125n.

In FIG. 8A, the list 800 includes entries 802, 804, 806, 808, 810, and 812. Each entry corresponds to different logical information (e.g., a different logical address). The entries are linked by pointers or links, denoted as "next." Each entry includes a pointer or a link that indicates an index of the next entry. For example, the entry 802 points to the entry 804 (via link 831), which points to the entry 806 (via link 832), which points to the entry 808 (via link 833), which points to the entry 810 (via link 834), which points to the entry 812 (via link 835).

Each entry includes information 851, 852, 854, 854, 855, 856, or 857 about the physical location (e.g., a physical address) of the data pages 112a-112n of the NVM 110. The physical location corresponds to the logical information of each entry. Each entry includes a validity flag 841, 842, 843, 844, 845, or 846 (e.g., 1 bit) indicative of whether this entry is valid. Each entry may include an iKey (logical information) 862, 863, 864, 865, 866, or 867, used for performing lookups.

In the conditional update method 900, GC is being performed on the logical address corresponding to the base entry 802. The entry base 802 is a valid entry that identifies the physical location of the data to be at the first physical location 730. At 910, the controller 105 adds the conditional entry 820 to the list 800 in the in-memory journal for a conditional update associated with the GC write. The GC write includes writing the data original stored in the first physical location 730 to the third physical location. The physical location included in the conditional entry 820 is the third physical location. The conditional entry 820 is a leaf entry that does not point to another entry in the list 800. The combined conditional entry 820 and base entry 802 contains the logical information and the two physical locations 714 & 718.

At 920, the controller 105 configures the base entry 802 to point to the conditional entry 820. As shown, instead of the iKey, the base entry 802 is configured to include a pointer 861 (e.g., a leaf pointer LEAF-PTR) to the conditional entry 820. The base entry 802 also has another pointer 831 that points to the next entry 804 in the list 800.

At 930, the controller 105 determines whether the conditional is resolved such that the third physical location is valid. The third physical location is valid if no intervening write operation occurs before 930. In response to determining that the controller 105 determining that the third physical location is valid (930:YES), the iKey 864 is copied based to the base entry 802 at 940, and the conditional entry 820 is freed at 950, as shown in FIG. 8B. The physical location 851 in the base entry 802 is configured to be the third physical location. Blocks 940 and 950 can be performed in any suitable order in response to 930:NO.

On the other hand, in response to determining that the controller 105 determining that the third physical location is not valid (930:NO), the base entry 802 is marked as invalid (841: invalid) at 960, and the conditional entry 820 is freed at 970, as shown in FIG. 8C. In the example shown in FIG. 7, the intervening host write updates the valid physical location to the second physical location 732, making the third physical location invalid. Blocks 960 and 970 can be performed in any suitable order in response to 930:YES.

Figure 10:
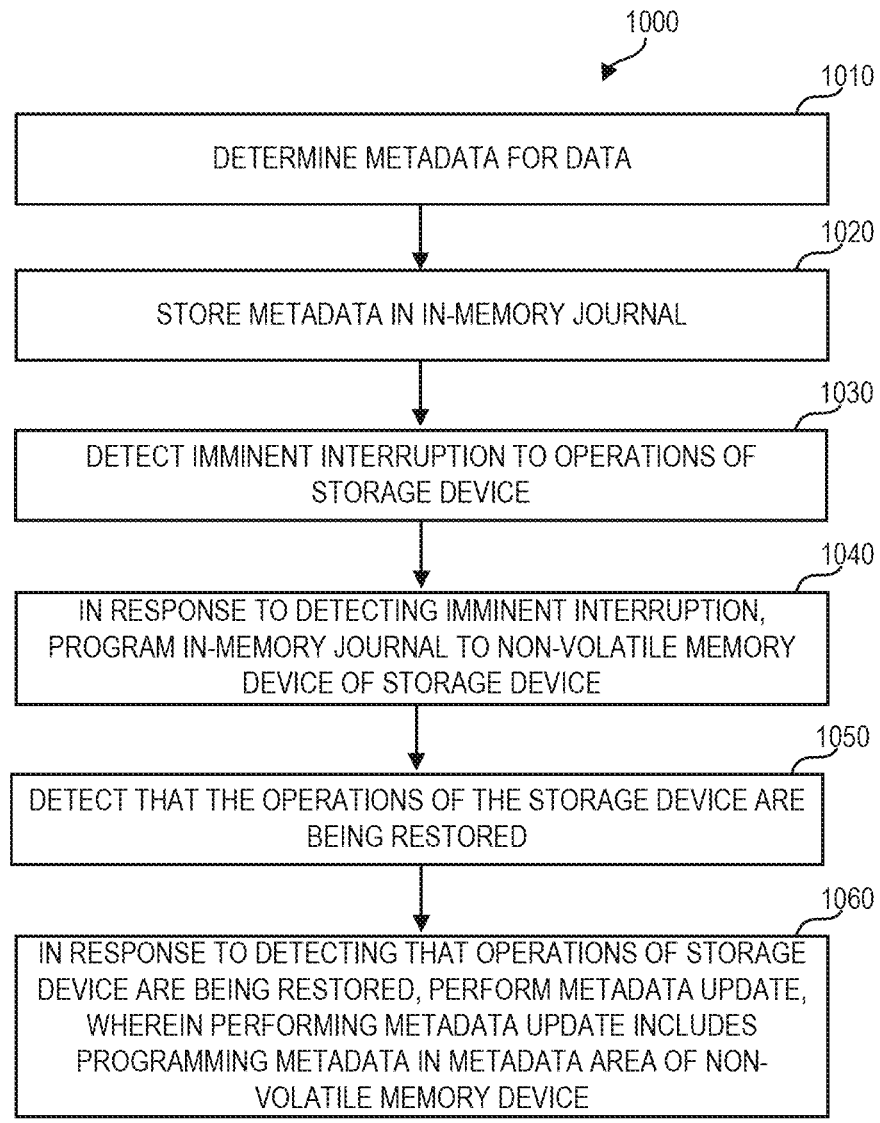
FIG. 10 is a flowchart diagram illustrating an example method for managing metadata using an in-memory journal, according to various arrangements.

FIG. 10 is a flowchart diagram illustrating an example method 1000 for managing metadata using an in-memory journal, according to various arrangements. Referring to FIGS. 1-10, the method 1000 can be performed by the controller 105. In some examples, the methods 200 and 300 are particular implementations of the method 1000.

At 1010, the controller 105 determines metadata for data. The data 101 is received from the host. For example, the controller 105 can receive a write command and the data from the host. The data is defined by a logical address. The metadata (e.g., the metadata update 102) includes mapping information that maps the logical information to at least one physical location of the NVM 110 of the storage device 100. Determining the metadata for the data includes determining the at least one physical location and the mapping information. In some examples, determining the metadata includes determining the at least one physical location using the logical information based on an L2P mapping table.

In some examples, the controller 105 allocates a write cache tag in response to determining the metadata for the data and queues updates to the metadata area using the write cache tag. The updates to the metadata area are queued prior to reading the metadata area.

At 1020, the controller 105 stores the metadata in the in-memory journal 120. In some examples, the controller 105 acknowledges the write command to the host after the metadata is stored in the in-memory journal 120. In some examples, storing the metadata in the in-memory journal 120 includes storing the metadata as an entry of a plurality of entries in a list (e.g., one of the lists 125a-125n) of the in-memory journal 120. The list stores updates to the metadata area. The plurality of entries of the list is added to the list according to an order in which data corresponding to the plurality of entries is received.

At 1030, the controller 105 detects an imminent interruption to operations of the storage device 100. In some examples, detecting the imminent interruption to the operations of the storage device includes detecting at least one of a power failure, lower power, or standby. With regard to detecting power failure, the controller 105 can receive a signal from a power source of the storage device 100. With regard to detecting a trigger for lower power operation or standby operation, the controller 105 can receive or detect an indicator from the host or another suitable entity, similar to experiencing power loss. At 1040, in some examples, the controller 105 programs the in-memory journal to the NVM 110 of the storage device 100 in response to detecting the imminent interruption. In other examples, block 1040 may be omitted if the in-memory journal 120 is stored in NV memory on-chip or in a multi-die module type controller which has a NV die implemented in something like PCM or MRAM.

At 1050, the controller 105 detect that the operations of the storage device are being or has been restored. In some examples, detecting that the operations of the storage device are being restored includes detecting at least one of power restore or resumption.

At 1060, the controller 105 performs metadata update. Performing the metadata update includes restoring the in-memory journal (e.g., at 340) and replaying the updated (e.g., at 350). Replaying the update includes programming the metadata in a metadata area of the NVM 110 in response to detecting that the operations of the storage device are being restored. The metadata area includes a metadata page, a metadata block, or another suitable location/area in the NVM 110. In some examples, performing the metadata update includes programming the metadata added to the list according to the order in which the data corresponding to the plurality of entries is received. In some examples, restoring the in-memory journal 120 may be omitted if the in-memory journal 120 is stored in NVM on-chip or in a multi-die module type controller which has a NV die implemented in, for example, PCM or MRAM. In some implementations, in cases such as sleep or suspend, where a low power state is entered or exited, replay of updates may not be needed.

GC is the process of collecting valid data (also referred to as source data) in an original location (e.g., an original block or another suitable unit) and copying that data to a new location (e.g., a new block or another suitable unit) to allow the original location (which likely contains a majority of invalid data) be erased. With reference to FIG. 1, the GC process in an SSD typically includes a copy operation such as (1) reading the source data to be relocated from the original block of the NVM 110 to a volatile memory (e.g., the SRAM 130 or another suitable volatile memory of the controller 105), (2) determining a new location (e.g., a new physical address) on a new block to which the GC data is to be copied, (3) programming the GC data to the new block of the NVM 110, and 4) updating the mapping information to point the logical address of the source data to the new block (updating the mapping to associate the logical address with the physical address of the new block).

GC data refers to the data that is temporarily read into or stored in the volatile memory (e.g., the SRAM 130) of the controller 105, where such GC data is to be written or programmed to the new block. Source data refers to the data that is stored in the original block that is to-be-erased. The GC copy operation copies several MB of GC data at one time to new blocks that may be distributed over several die.

Traditionally, responsive to power loss, the GC data is flushed to the power fail pages/blocks 116a-116n. In addition, due to the asynchronous nature of the copy operations and the fact that the copy operations occur on different die, the copy operations may be performed out of order. This can become a problem during power loss because some GC copy operations may have been completed while others may not have. In that regard, the traditional mechanisms consume precious backup power to program extra data unnecessarily.

Applicant recognizes that during power loss, it is preferable to shut off the backup power as quickly as possible (e.g., to provide the minimum amount of back power as is possible). Thus, it is preferable to perform a minimum amount of work in response to power loss. In that regard, data that can be recovered by another mechanism after power restore can be discarded during power loss. Accordingly, GC data associated with GC operations that have not been completed at the time of power loss is a good candidate for discarding in response to power loss, given that the source data remains on the original block to be erased in the NVM 110. In other words, instead of instead flushing the GC data to the NVM 110 as done traditionally, the arrangements disclosed herein provides for discarding the GC data in response to imminent interruption (e.g., power loss, low power, sleep, suspend, standby, or so on).

In some arrangements, the metadata update 102 (e.g., the mapping information) for any incomplete GC operations is managed and stored separately. In some examples, the metadata update 102 for the incomplete GC operations is discarded to prevent the data that is in an indeterminate, unknown, or conditional state from being pointed to by the L2P mapping information.

Figure 11:
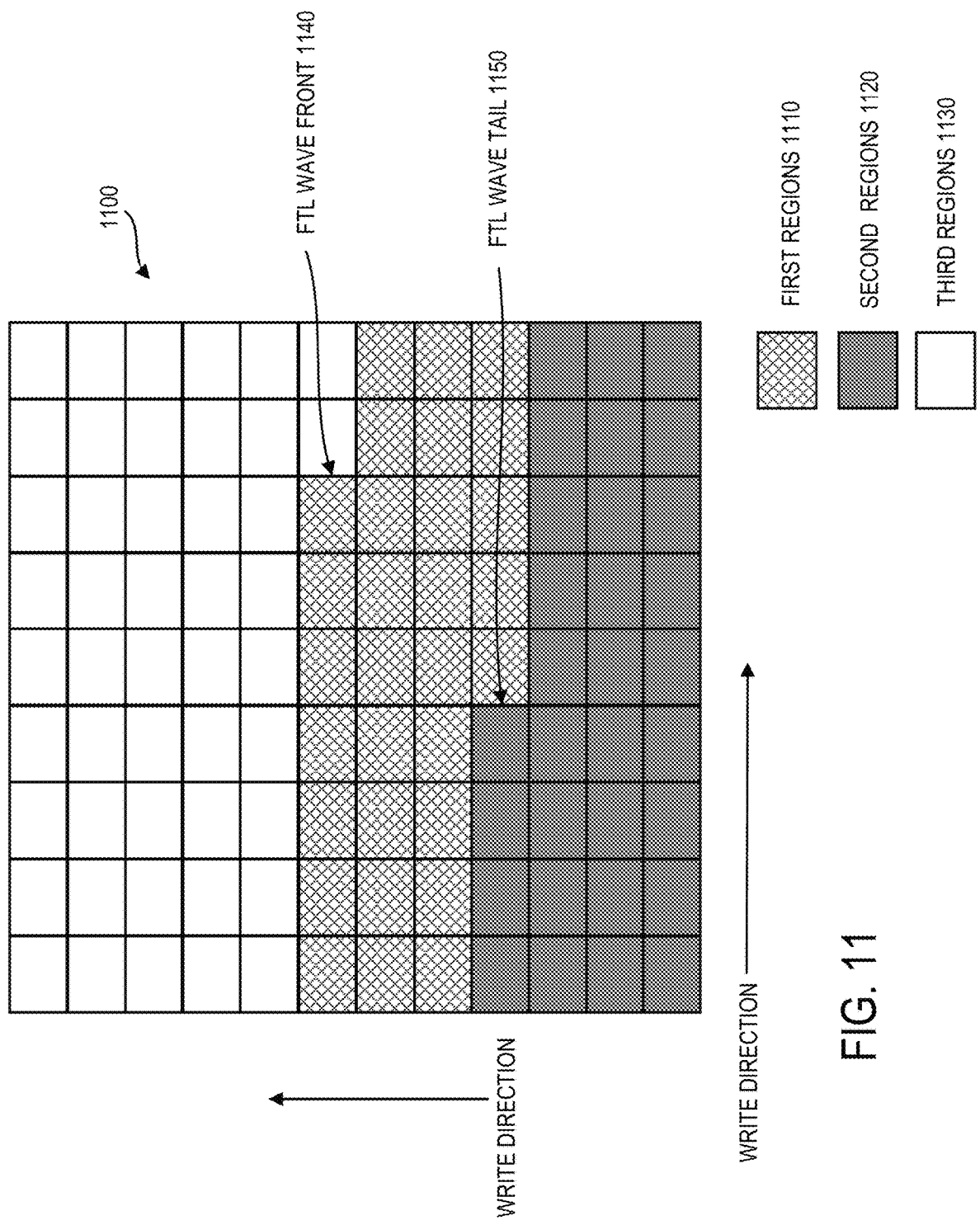
FIG. 11 is a diagram illustrating status of copy operations of GC at the moment when imminent interruption is detected, according to various arrangements.

FIG. 11 is a diagram illustrating status of copy operations 1100 of GC at the moment when imminent interruption is detected, according to various arrangements. In other words, FIG. 11 illustrates the status of copy operations 1100 in response to receiving an indication of the interruption or imminent interruption (e.g., a signal indicating power loss, low power, sleep, suspend, standby, or so on). Referring to FIGS. 1-11, each box shown in the status of copy operations 1100 corresponds to a region of a wave module. A region corresponds to data (e.g., GC data) stored in one or more locations in the NVM 110. The data in the regions may be queued to be written to other locations of the NVM 110. The data can be queued in any suitable manner. Each region corresponds to one or more logical addresses. The controller 105 can determine or otherwise allocate a physical address of each new location to which the GC data is to be programmed. As shown, the order by which the data in the queue is written or programmed to the NVM 110 is from left to right and from bottom to top. In some examples, data in two or more regions (e.g., several MB) can be sent to the NVM 110 to be programmed at the same time.

The regions shaded with a pattern, referred to as first regions 1110, may or may not have been sent to the NVM 110 to be programmed. Data corresponding to the first regions 1110 that has a completion status of unknown is referred to as first data. The boxes shaded solid, referred to as second regions 1120, represent data with the completion status of confirmed. Data corresponding to the second regions 1120 that has a completion status of confirmed or completed is referred to as second data. The unshaded boxes represent regions (e.g., erased regions) without any data. The third regions 1130 do not yet correspond to any data to be sent to the NVM 110. The controller 105 has determined the metadata update 102 for the first data and the second data and has not yet determined the any metadata for the third data or the third regions 1130, which do not yet correspond to data.

Due to the asynchronous nature of the copy operations, the controller 105 can determine whether the copy operation with respect to certain data has been successful at certain checkpoints. In some examples, the controller 105 can keep track of the status of the status of the copy operations 1100. For example, the controller 105 can receive NVM program status information from a channel controller, which programs data to the NVM 110 and obtains feedback from the NVM 110 regarding whether the programming has been successful. In some examples, in response to determining that programming has been successful based on the feedback from the NVM 110, the channel controller sends an indication to the controller 105 that the copy operation with respect to a given logical address and/or a given physical address has been completed. The controller 105 can then confirm that the data identified by the logical address and/or the physical address has been successfully written to the NVM 110. In that regard, the second data refers to data that has been confirmed by the flash system to have been successfully programmed to the NVM 110. The metadata (e.g., the metadata update 102) for the second data is stored in the in-memory journal 120 in response to confirming the completion.

The first data, represented by the first regions 1110, refers to data sent to the NVM 110 to program, but the completion indication has not yet been received. For example, sending the first data to the NVM 110 refers to sending the first data to one or more of a write buffer (e.g., the write buffer 135), the channel controller for programming to the NVM 110, or so on. In other words, it is possible that the first data may be in the write buffer 135, may be in the process of being programmed by the channel controller, or may be successfully programmed to the new locations of the NVM 110. While the controller 105 has allocated the new locations (e.g., the physical addresses corresponding thereto) to program the first data, it is unknown whether the first data has been successfully programmed to the new locations.

In response to sending any data (including the first data and the second data) to the NVM 110, the metadata for that data is stored in a suitable memory device (e.g., a memory device of a wave module, not shown). As described, in response to confirming that the data is successfully programed to the NVM 110, the metadata for that data (which is now referred to as the second data) is stored in the in-memory journal 120 or the L2P mapping table. In other words, although programming of the first data has been initiated, the completion status of the first data is unknown at the time of detecting the imminent interruption. On the other hand, programming of the second data is known to be successful at the time of detecting the imminent interruption. The third data refers to data that has not been sent to the NVM 110.

The point between the first data (or the first region 1110) and the second data (or the second region 1120) is referred to as an FTL wave tail 1150 of the copy operations. In other words, the FTL wave tail 1150 separates the second regions 1120 representing data confirmed to have been programmed to the new locations from the first regions 1110 representing data that has not been confirmed to have been programmed to the new locations. It should be noted that programming of data in a region may include programming the data to many NVM pages, and the programming operation may well be completed out-of-order (order represented by the arrows in FIGS. 11 and 12). However, the FTL wave tail 1150 advances only when all programs in its advancement path are completed. For example, if sequential pages a, b and c are being programmed, and programming pages b and c has been completed, the FTL wave tail 1150 does not advance immediately (e.g., pages a, b, and c are still in the first regions 1110 instead of the second regions 1120). Once programming page a completes, the FTL wave tail 1150 will advance to include a, b and c in the second regions 1120. However, if page a completes before pages b and c are completed, the FTL wave tail 1150 will advance to include a in the second regions 1120, and will the advance again to include pages b and c in the second regions 1120 once programming pages b and c are completed.

The point between the first regions 1110 and the third regions 1130 is referred to as an FTL wave front 1140 of the operations. In other words, the FTL wave front 1140 separates data (e.g., the first and second data) with the metadata update 102 from data (e.g., third data) for which metadata has not been generated. As program completion is confirmed for some of the first data, some of the first data becomes the second data. Correspondingly, some of the first regions 1110 become the second regions 1120, and the FTL wave tail 1150 moves forward in the block address space. As the metadata for some of the third data is generated and as the some of the third data is sent to the NVM 110, some of the third data becomes the first data. Correspondingly, some of the third regions 1130 become the first regions 1110, and the FTL wave front 1140 moves forward.

In some examples, the metadata associated with the first data (referred to as first metadata) is stored separately (e.g., in the wave module) from other metadata (e.g., second metadata associated with the second data) in the in-memory journal 120. It should be noted that all the first metadata for the first data is conditional. The second metadata of the second data can be a mix of conditional and conditional resolved data stored in the in-memory journal 120, depending on when the condition is resolved.

In response to detecting an imminent interruption, it is difficult to determine the precise completion status of the first data. Therefore, in some arrangements, the first metadata associated with the first data that has been generated, which is stored in a memory device like that of the wave module, is discarded (e.g., not saved to the NVM 110) in response to detecting an imminent interruption. This constructively discards the first data given that without valid mapping, even if some or all of the first data has already been written to the new physical addresses corresponding to the new locations. In other words, in the event of power fail the first data is effectively invalid as the map is never updated to reference it.

Figure 12:
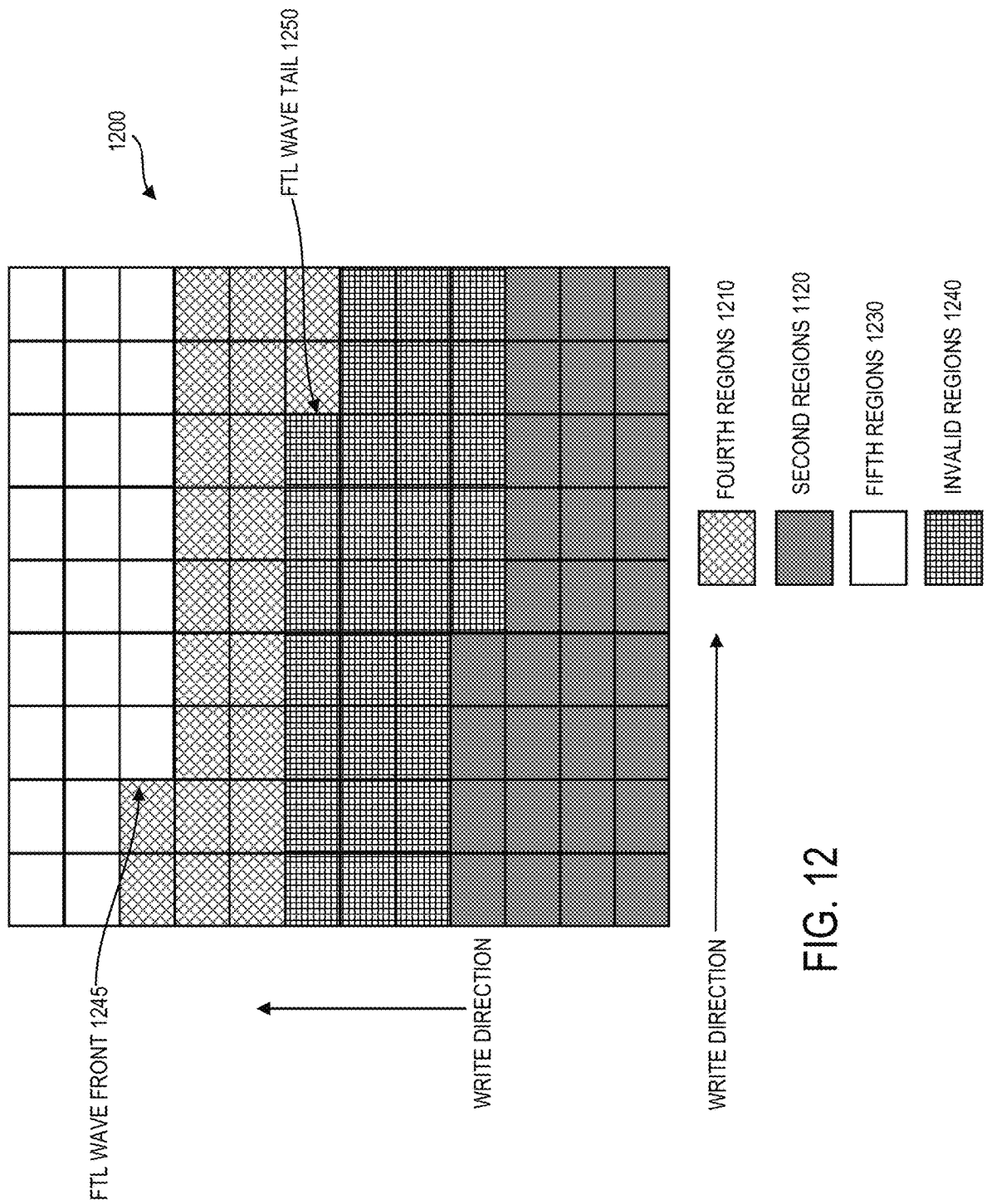
FIG. 12 is a diagram illustrating status of copy operations of GC at the moment when resumption occurs, according to various arrangements.

FIG. 12 is a diagram illustrating status of copy operations 1200 of GC at the moment shortly after when resumption occurs, according to various arrangements. In other words, FIG. 12 illustrates the status of copy operations 1200 in response to receiving an indication of the resumption (e.g., a signal indicating power restore, resume, or so on) and starting a new copy operation. Referring to FIGS. 1-12, similar to the status of copy operations 1100, each box shown in the status of copy operations 1200 corresponds to a region of a wave module.

The regions shaded with a first pattern, referred to as fourth regions 1210, correspond to data that may or may not have been sent to the NVM 110 to be programmed. Data corresponding to the fourth regions 1210 that has a completion status of unknown is referred to as fourth data. The regions shaded solid, referred to as the second regions 1120, represent the second data, where the completion status of the second data is confirmed at the time of the interruption, which remains the same as compared to the status of copy operations 1100. The unshaded boxes represent regions (e.g., erased regions) without any data. The fifth regions 1230 do not yet correspond to any data. In other words, the controller has not yet allocated any new location (or physical addresses thereof) for programming fifth data. The boxes shaded with a second pattern represent invalid regions 1240, which correspond to data that may or may not have been stored in the NVM 110. The invalid data is the same as the first data at the time of interruption, and the invalid region 1240 is the same as the previous first regions 1110. As described, the first data is constructively discarded in response to the imminent interruption given that the first metadata corresponding to the first data has been discarded in response to the interruption. Therefore, upon resuming operations, the first data is shown as invalid data in the status of copy operations 1200.

The fourth data refers to data sent to the NVM 110 (e.g., to the channel controller) to program in response to resuming operations after the interruption, but the completion indication has not yet been received. The fourth regions 1210 has been some of the third regions 1130 that is at the FTL wave front 1140 at the time when the imminent interruption has been detected. In response to sending the fourth data to the NVM 110, the metadata for the fourth data 1210 is stored in a suitable memory device (e.g., the memory device of the wave module). In response to confirming that the fourth data is successfully programed to the NVM 110, the metadata for the fourth data is stored in the in-memory journal 120 or the L2P mapping table. In other words, although programming of the fourth data has been initiated, the completion status of the fourth data is unknown at the status of copy operations 1200. The fifth data refers to data that has not been sent to the NVM 110.

The point between the fourth data (or the fourth regions 1210) and the invalid data (e.g., the invalid regions 1240) is referred to as an FTL wave tail 1250 of the operations 1200. In other words, the FTL wave tail 1250 separates the invalid regions 1240 representing invalid data from the fourth regions 1210 representing data that has not been confirmed to have been programmed to the new locations of the NVM 110. The point between the fourth data (or the fourth regions 1210) and the fifth data (or the fifth regions 1230) is referred to as an FTL wave front 1245 of the operations 1200. In other words, the FTL wave front 1245 separates data (e.g., the fourth data and the second data) with the metadata update 102 from data (e.g., fifth data) for which metadata has not been generated. In response to resuming the operations, the GC operation (e.g., GC write) resumes at the checkpoint of the FTL wave front 1140. The FTL wave tail 1250 is located at the FTL wave front 1140. As the metadata for some of the fifth data is generated and as the some of the fifth data is sent to the NVM 110, some of the fifth data becomes the fourth data. Correspondingly, some of the fifth regions 1230 become the fourth regions 1210, and the FTL wave front 1245 moves forward.

Accordingly, in response to determining resumption, a new checkpoint at the FTL wave tail 1250 is established at the end of the discarded region, which is the FTL wave front 1140. Programming can resume by copying the fourth data to the NVM 110.

As described, due to the asynchronous nature of the copy operations, the controller 105 can determine whether the copy operation with respect to certain data has been successful at certain checkpoints. In response to an interruption, the metadata for all data in the queue that is after the most recent checkpoint is discarded. With reference to the status of the copy operations 1100 and 1200, the checkpoint for the interruption or the imminent interruption corresponds to the FTL wave tail 1150.

Figure 13:
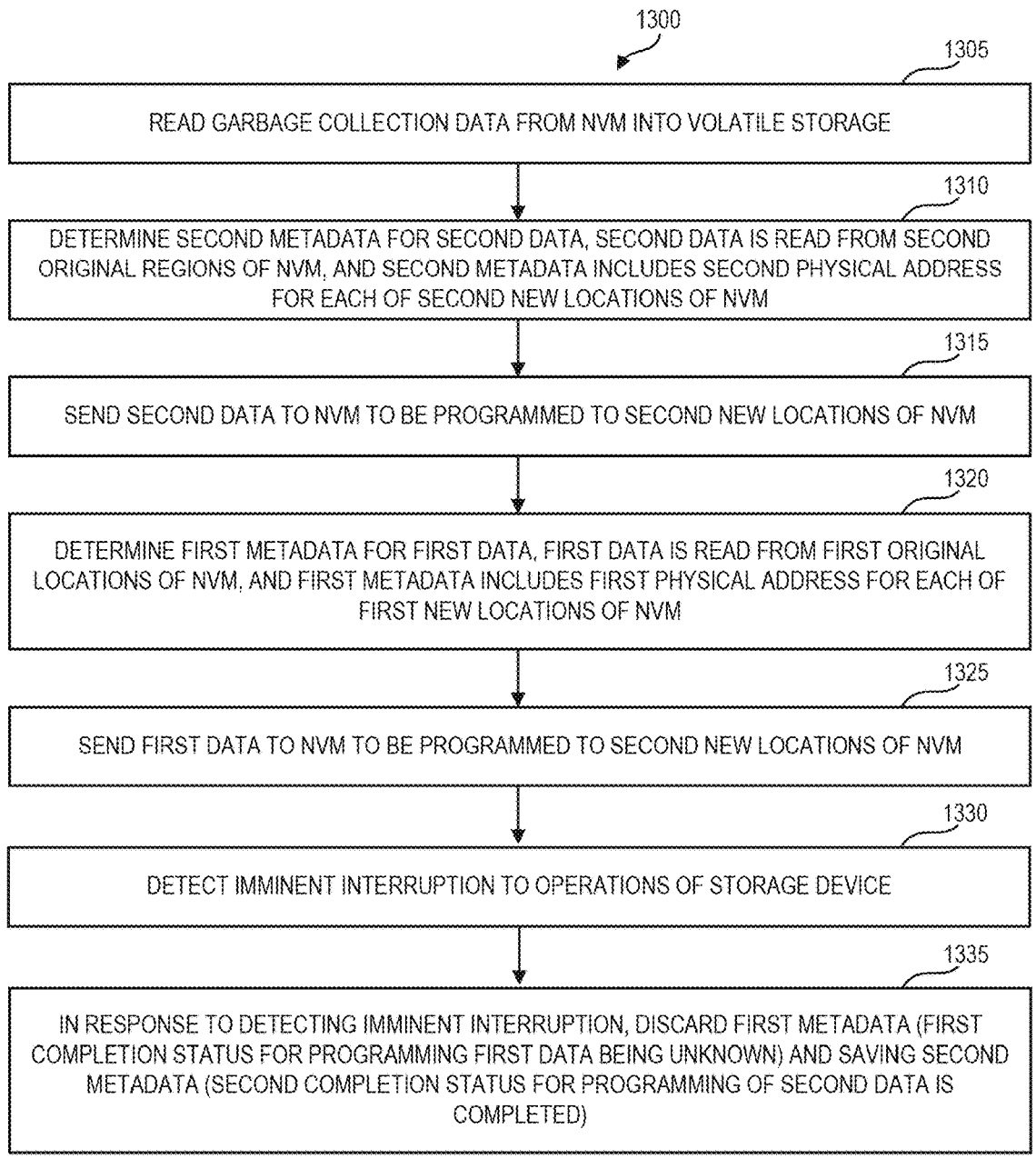
FIG. 13 is a flowchart diagram illustrating an example method for managing metadata for GC, according to various arrangements.

FIG. 13 is a flowchart diagram illustrating an example method 1300 for managing metadata for GC, according to various arrangements. Referring to FIGS. 1-13, the method 1300 can be performed by the controller 105. In some examples, based on the original metadata (e.g., the original physical addresses) of certain data, a GC decision is made to move valid GC data on a block to new locations in the NVM 110 and erase all data on the block. At 1305, the controller 105 reads GC data from the NVM 110 into a volatile storage. An example of the volatile storage includes the SRAM 130 or another suitable volatile storage. The GC data is read from the original locations of the NVM 110 identified by the original physical addresses as discussed below. GC data (e.g., the first data and the second data) is read from the NVM at 1305, the metadata for the first data and the second data is determined at 1310 and 1320, and the first data and the second data are sent to the NVM at 1315 and 1325. The second data may be read before the first data at 1305 in some examples. In some implementations, the order of the data (e.g., the first data and the second data) is maintained throughout the GC operation to improve sequential performance. In some examples, the second metadata is determined (e.g., at 1310) before the first metadata is determined (e.g., at 1320). In some examples, the second data is sent to the NVM 110 (e.g., at 1315) before the first data is sent to the NVM 110 (e.g., at 1325). In some examples, the first metadata may be determined at 1320 while the second data is being sent to the NVM 110 at 1315.

At 1310, the controller 105 determines second metadata for the second data. The second data is read from second original locations of the NVM 110. Each of the second original locations is a second block, page, or another unit of the NVM 110. The second data is second valid data read from the second block, page, or another unit into the volatile storage of the storage device 100. The second metadata includes a second physical address for each of second new locations of the NVM 110. The second metadata further includes a second mapping that maps the second physical address for each of the second new locations to at least one first logical address. Each of the first new locations is a second block, page, or another unit of the NVM 110. The first metadata is stored in a suitable memory device (e.g., the memory device of the wave module).

At 1315, the controller 105 sends the first data to the NVM 110 to be programmed to the first new locations of the NVM 110. In some examples, sending the first data to the NVM 110 to be programmed to the first new locations includes sending the first data to a channel controller and programming, by the channel controller, the first data to the first new locations.

In some examples, in response sending the second data to the NVM 110, the second completion status is unknown. The second metadata remains in the memory device of the wave module and is not yet entered into the in-memory journal 120 or the L2P table. In some examples, sending the second data to the NVM 110 to be programmed to the second new locations further includes determining that programming the second data to the second new locations has been completed, and in response to determining that programming the second data to the second new locations has been completed, changing the second completion status to completed. In some examples, changing the second completion status to completed includes saving the second metadata as valid metadata in the in-memory journal 120 or the L2P table.

At 1320, the controller 105 determines first metadata for first data. The first data is read from first original locations of the NVM 110. Each of the first original locations is a third block, page, or another unit of the NVM 110. The first data is first valid data read from the third block, page, or another unit into the volatile storage of the storage device 100. The first metadata includes a first physical address for each of first new locations of the NVM 110. The first metadata further includes a first mapping that maps the first physical address for each of the first new locations to at least one first logical address. Each of the first new locations is a fourth block, page, or another unit of the NVM 110. The first metadata is stored in a suitable memory device (e.g., the memory device of the wave module). In some examples, the first metadata is determined prior to determining the first metadata. In some examples, the first data has a position that is before the position of first data in a queue for copy operations.

At 1325, the controller 105 sends the first data to the NVM 110 to be programmed to the first new locations of the NVM 110. In some examples, sending the first data to the NVM 110 to be programmed to the first new locations includes sending the first data to the channel controller and programming, by the channel controller, the first data to the first new locations.

In some examples, in response sending the first data to the NVM 110, the first completion status is unknown. The first metadata remains in the memory device of the wave module and is not yet entered into the in-memory journal 120 or the L2P table.

At 1330, the controller 105 detects an imminent interruption to operations of the storage device 100. In some examples, detecting the imminent interruption to the operations of the storage device includes detecting at least one of a power failure, low power, sleep, suspend, standby, or so on. In response to detecting the imminent interruption, entries not in the in-memory journal 120 are discarded, and entries in the in-memory journal 120 are saved to the NVM 110. For example, the metadata stored in the memory device of the wave module that have not yet been transferred to the in-memory journal 120 is discarded. The metadata stored in the memory device of the wave module at the time of detecting the imminent interruption includes the first metadata. The metadata stored in the in-memory journal 120 at the time of detecting the imminent interruption includes the entries for the second metadata.

For example, at 1335, in response to detecting an imminent interruption to operations of the storage device 100, the controller 105 discards the first metadata and saves the second metadata. The controller 105 discards the first metadata given that the first completion status is unknown at the time that the imminent interruption has been detected. The first completion status for the first data is unknown given that it is not stored in the in-memory journal 120 at the time of detecting the imminent interruption. The controller 105 saves the second metadata given that the second completion status for programming of the second data 1120 is completed in response to detecting the imminent interruption to operations of the storage device 100. The first data is constructively discarded given that the first metadata (e.g., mapping information) pointing to the first physical address for each of first new locations has been discarded. In other words, only the entries in the in-memory journal 120 are saved.

In some arrangements, the controller 105 determines that the first completion status for programming of the first data is unknown in response to detecting an imminent interruption to operations of the storage device 100. The controller 105 discards the first metadata in response to determining that the first completion status is unknown at the time that the imminent interruption has been detected. In some arrangements, the controller 105 determines that second completion status for programming of the second data 1120 is completed in response to detecting the imminent interruption to operations of the storage device 100. The controller 105 saves the second metadata in response to detecting the imminent interruption, for example, by saving the entries in the in-memory journal 120 as described.

In some arrangements, in response to detecting that the operations of the storage device are being restored, the controller 105 determines additional metadata for additional data (e.g., the fourth data). The additional data is read from additional original locations of the NVM 110. The additional metadata includes an additional physical address for each of additional new locations of the NVM 110. The additional data being different from the first data and the second data. In some examples, detecting that the operations of the storage device 100 are being restored includes detecting at least one of power restore or resumption.

Accordingly, in response to detecting the imminent interruption to the operations of the storage device 100, the controller 105 discards to-be-discarded metadata for data that is being copied to the NVM 110 after a checkpoint, an example of which is the FTL wave tail 1150. As shown, the checkpoint is immediately after a last region of the second region 1120 for which a second completion status for programming the second data is completed. This checkpoint is between all of the second regions 1120 and the first regions 1110. The to-be-discarded metadata includes the first metadata illustrated with respect to the status of copy operations 1100 and the status of copy operations 1200. Another checkpoint for resuming the copy operations after resuming operations is the FTL wave front 1140, which is immediately after a last region of the first region 1110 for which a first completion status for programming the second data is unknown. The checkpoint is between all of the third regions 1130 and the first regions 1110.

In some arrangements, the checkpoint be determined based on a position of metadata in the wave module. For example, based on the metadata update 102 in the in-memory journal 120 is written to the NVM 110 along with the data, to indicate the logical blocks (corresponding to the data) that have been written in the NVM 110. This in-memory journal 120, which is an index table, is a convenient checkpoint for the discard operation because the in-memory journal 120 allows rebuild operations during recovery to have improved efficiency.

Figure 14:
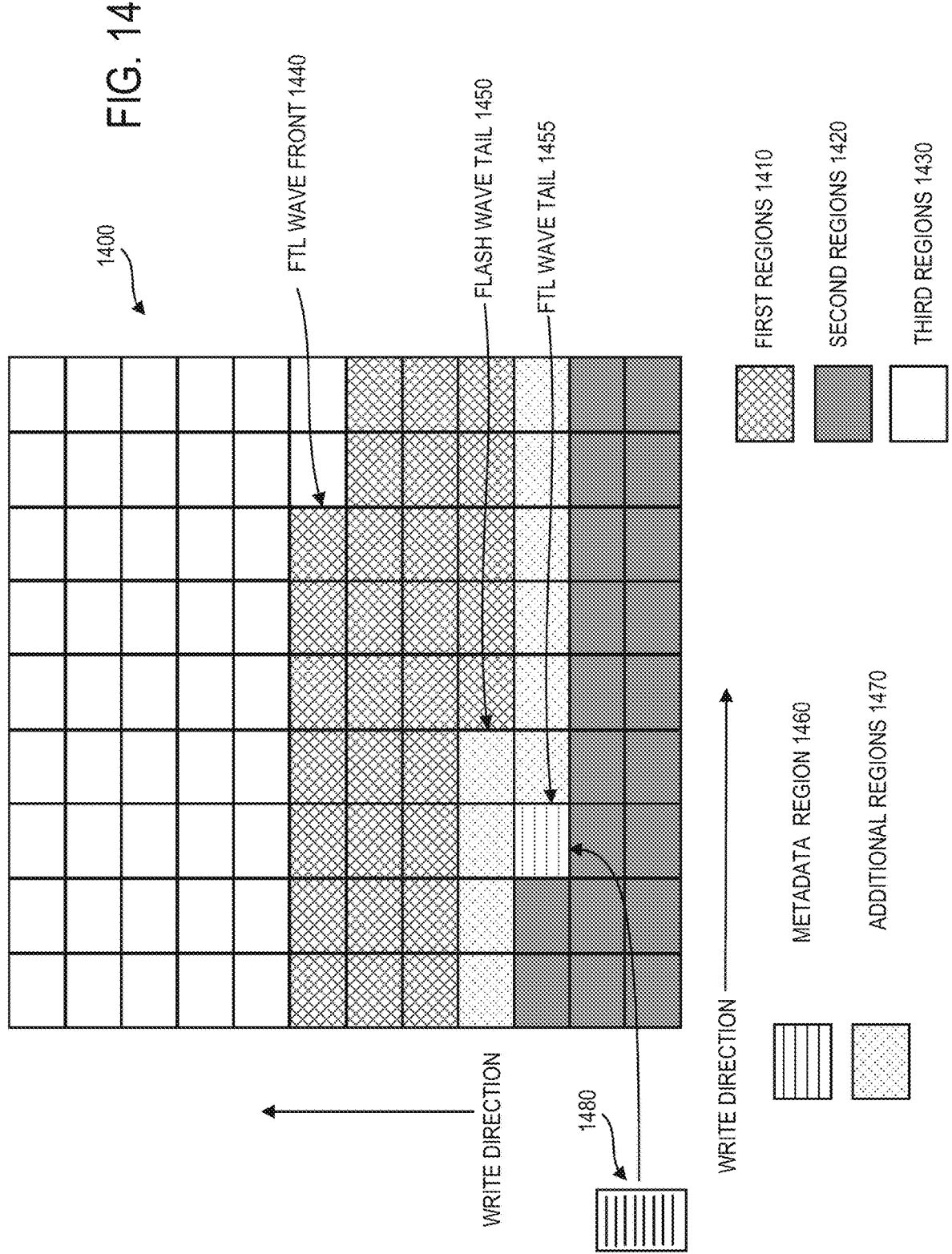
FIG. 14 is a diagram illustrating status of copy operations of GC at the moment when imminent interruption is detected, according to various arrangements.

FIG. 14 is a diagram illustrating status of copy operations 1400 of GC at the moment when imminent interruption is detected, according to various arrangements. In other words, FIG. 14 illustrates the status of copy operations 1400 in response to receiving an indication of the interruption or imminent interruption (e.g., a signal indicating power loss, low power, sleep, suspend, standby, or so on). Referring to FIGS. 1-14, the status of copy operations 1400 is similar to the status of copy operations 1100 except that the in-memory journal 120 is interleaved among data for the copy operations.

Each box shown in the status of copy operations 1400 corresponds to a region in the wave module, which can be used for data (e.g., GC data) and metadata (e.g., the in-memory journal 120). The data with the metadata interleaved therein can be queued in any suitable manner to be written to the NVM 110. Each region corresponds to one or more logical addresses. The controller 105 can determine or otherwise allocate a physical address of each new location to which the GC data is to be programmed. As shown, the order by which the data and metadata are written or programmed to the NVM 110 is from left to right and from bottom to top. In some examples, data and metadata in two or more regions (e.g., several MB) can be sent to the regions of the NVM 110 to be programmed at the same time.

The regions shaded with a first pattern, referred to as first regions, may or may not have been sent to the NVM 110 to be programmed. Data corresponding to the first regions 1410 that has a completion status of unknown is referred to as first data. The boxes shaded solid, referred to as second regions 1420, represent data with the completion status of confirmed. Data corresponding to the second regions 1420 with a completion status of confirmed or completed is referred to as second data. The unshaded boxes represent regions (e.g., erased regions without any data. The third regions 1430 do not yet correspond to any data to be sent to the NVM 110. The controller 105 has determined the metadata update 102 for the first data and the second data and has not yet determined the any metadata for the third data or the third regions 1430, which do not yet correspond to data. In addition, the box shaded with a second pattern represent additional regions 1470 corresponding to data with the completion status of confirmed, but the metadata corresponding to such data is not saved in the NVM 110 (e.g., the in-memory journal 120 containing such metadata has not been saved in the NVM 110). This type of data is referred to additional data. The metadata region 1460 represents metadata (e.g., in the in-memory journal 120) that is saved in the NVM 110.

The controller 105 has determined the metadata update 102 for the first data, the second data, and the additional data. The metadata update 102 for the additional data is referred to as additionally discarded metadata. The controller 105 has not yet determined any metadata for the third data.

In some examples, the controller 105 can keep track of the status of the status of the copy operations 1400. For example, the controller 105 can receive NVM program status information from a channel controller. In some examples, in response to determining that programming has been successful based on the feedback from the NVM 110, the channel controller sends an indication to the controller 105 that the copy operation with respect to a given logical address and/or a given physical address has been completed. The controller 105 can then confirm that the data identified by the logical address and/or the physical address has been successfully written to the NVM 110. In that regard, the second data and the additional data refer to data that has been confirmed by the flash system to have been successfully programmed to the NVM 110.

The first data, represented by the first regions 1410, refers to data sent to the NVM 110 to program, but the completion indication has not yet been received. For example, sending the first data to the NVM 110 refers to sending the first data to one or more of a write buffer (e.g., the write buffer 135), the channel controller for programming to the NVM 110, or so on. In other words, it is possible that the first data may be in the write buffer 135, may be in the process of being programmed by the channel controller, or may be successfully programmed to the new locations of the NVM 110. While the controller 105 has allocated the new locations (e.g., the physical addresses corresponding thereto) to program the first data, it is unknown whether the first data has been successfully programmed to the new locations.

In response to sending any data (including the first data, the second data, and the additional data) to the NVM 110, the metadata for that data is stored in a suitable memory device (e.g., a memory device of a wave module, not shown). In other words, although programming of the first data has been initiated, the completion status of the first data is unknown at the time of detecting the imminent interruption.

After successfully programming data corresponding to a number of consecutive regions, the controller 120 stores, in locations corresponding to the metadata region 1460, a log 1480 containing the metadata corresponding to the data associated with those regions. For example, the metadata stored in the locations corresponding to the metadata region 1460 contains the log 1480 with the metadata entries for one or more mappable units of data immediately before the metadata region 1460. While only the metadata region 1460 is shown in the diagram, it is to be understood that every one or more regions of data is followed by a metadata region containing a log 1480 corresponding to metadata for the mappable units of data for those regions.

After confirming that the data is successfully programed to the NVM 110 and in response to determining that the metadata 1460 for that data has been confirmed to be saved to the NVM 110, the metadata for that data (which is now referred to as the second data) is deemed to be valid and sent to the in-memory journal. Accordingly, all of the second data is deemed to be valid because the corresponding metadata has been saved in the NVM 110. Although the additional data corresponding to the additional regions 1470 is data that has been confirmed by the flash system to have been successfully programmed to the NVM 110, the metadata corresponding to the additional data (referred to as additionally discarded metadata) has not been confirmed to have been saved to the NVM 110. Thus, the additionally discarded metadata for the additional data remains in the unknown state at the time of detecting the imminent interruption.

The point between the additional data (or the regions 1470) and the metadata (or the metadata region 1460) is referred to as an FTL wave tail 1455 of the copy operations. In other words, the FTL wave tail 1455 separates regions 1420 and 1460 representing data confirmed to have been programmed to the NVM 110 (including corresponding log 1480) from the additional regions 1470 representing data that has been confirmed to have been programmed to the NVM 110 without the corresponding log 1480 being confirmed to have been programmed to the NVM 110. The FTL wave tail 1455 is set as the checkpoint such that any metadata for data to be programmed in the NVM 110 after the FTL wave tail 1455 in the block is discarded. As noted above, programming of data in a region may include programming the data to many NVM pages, and the programming operation may well be completed out-of-order (order represented by the arrows in FIGS. 13 and 14). However, the FTL wave tail 1455 advances only when all programs in its advancement path are completed.

The point between the additional data (or the regions 1470) and first data (or the first regions 1410) is referred to as a flash wave tail 1450 of the copy operations. The flash wave tail 1450 separates the regions 1470, 1460, and 1420 having data confirmed to have been programmed to the NVM 110 from the regions 1410 having data that has not been confirmed to have been programmed to the NVM 110.

The point between the first data (or the first regions 1410) and the third data (or the third regions 1430) is referred to as an FTL wave front 1440 of the operations. In other words, the FTL wave front 1440 separates data (e.g., the first, second, and additional data) with the metadata update 102 from data (e.g., third data) for which metadata update 102 has not been generated. As program completion is confirmed for some of the first data, some of the first data becomes the additional data. Correspondingly, some of the first regions 1410 become the additional regions 1470, and the flash wave tail 1450 moves forward in the queue. As the completion status is confirmed for some of the additional data, the additional data becomes the second data. Correspondingly, some of the additional regions 1470 become the second regions 1420, and the FTL wave tail 1455 moves forward in the queue. As the metadata update 102 for some of the third data is generated and as the some of the third data is sent to the NVM 110, some of the third data becomes the first data. Correspondingly, some of the third regions 1430 become the first regions 1410, and the FTL wave front 1440 moves forward.

Figure 15:
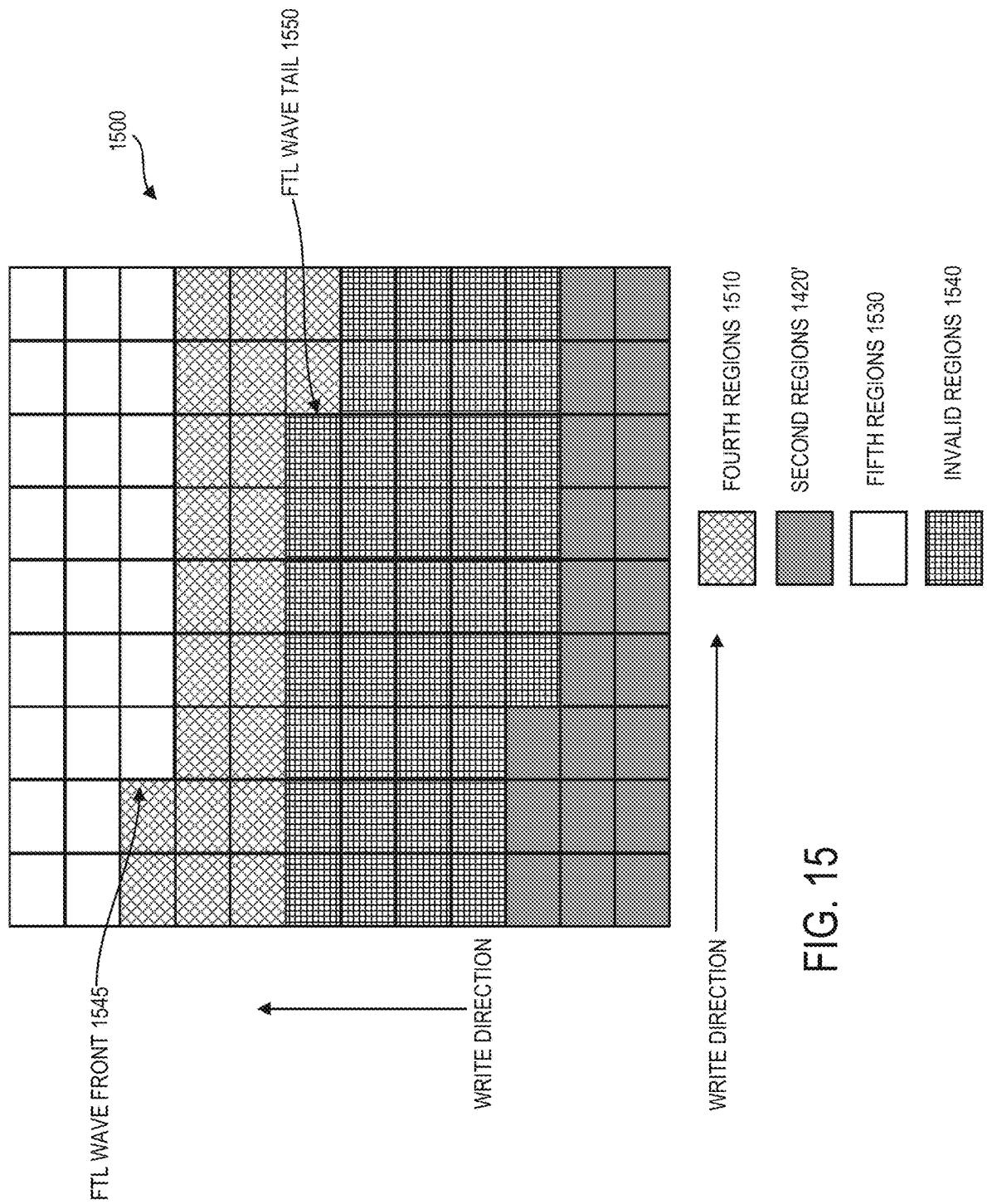
FIG. 15 is a diagram illustrating status of copy operations of GC at the moment when resumption occurs, according to various arrangements.

FIG. 15 is a diagram illustrating status of copy operations 1500 of GC at the moment when resumption occurs, according to various arrangements. In other words, FIG. 15 illustrates the status of copy operations 1500 in response to receiving an indication of the resumption (e.g., a signal indicating power restore, resume, or so on). Referring to FIGS. 1-15, similar to the status of copy operations 1400, each box shown in the status of copy operations 1500 corresponds to a region of a wave module.

The regions shaded with a first pattern, referred to as fourth regions 1510, correspond to data that may or may not have been sent to the NVM 110 to be programmed. Data corresponding to the fourth regions 1510 has a completion status of unknown is referred to as fourth data. The regions shaded solid, referred to as the second regions 1420', represent the second data and the metadata with the completion status of confirmed at the time of the interruption. The unshaded boxes represent regions (e.g., erased regions) without any data. The fifth regions 1530 do not yet correspond to any data. In other words, the controller has not yet allocated any new locations (or physical addresses thereof) for programming fifth data. The boxes shaded with a second pattern represent invalid regions 1540, which correspond to data that may or may not have been stored in the NVM 110. The invalid data is the same as the first data plus the additional data at the time of interruption, and the invalid regions 1540 includes the first regions 1410 and the additional regions 1470. As described, the first data plus the additional data are constructively discarded in response to the imminent interruption given that the first metadata corresponding to the first data plus the additional data has been discarded in response to the interruption. Therefore, upon resuming operations, the first data plus the additional data is shown as invalid data in the status of copy operations 1500.

The fourth data refers to data sent to the NVM 110 (e.g., to the channel controller) to program in response to resuming operations after the interruption, but the completion indication has not yet been received. The fourth regions 1510 has been some of the third regions 1430 that is at the FTL wave front 1440 at the time when the imminent interruption has been detected. In response to sending the fourth data to the NVM 110, the metadata for the fourth data 1510 is stored in a suitable memory device (e.g., the memory device of the wave module). In response to confirming that the fourth data and its associated log 1480 are successfully programed to the NVM 110, the metadata for the fourth data is deemed as valid. In other words, although programming of the fourth data has been initiated, the completion status of the fourth data is unknown at the status of copy operations 1500. The fifth data refers to data that has not been sent to the NVM 110.

The point between the fourth data (or the fourth regions 1510) and the invalid data (or the invalid regions 1540) is referred to as an FTL wave tail 1550 of the operations 1500. In other words, the FTL wave tail 1550 separates the invalid regions 1540 representing invalid data from the fourth regions 1510 representing data that has not been confirmed to have been programmed to the NVM 110 that also does not have its corresponding in-memory journal 120 confirmed to have been programmed to the NVM 110. The point between the fourth data (or the fourth regions 1510) and the fifth data (or the fifth regions 1530) is referred to as an FTL wave front 1545 of the operations 1500. In other words, the FTL wave front 1545 separates data with the metadata update 102 from data for which metadata update 102 has not been generated. In response to resuming the operations, the GC operation (e.g., GC write) resumes at the checkpoint of the FTL wave front 1440. The FTL wave tail 1550 is located at the FTL wave front 1440. As the metadata for some of the fifth data is generated and as the some of the fifth data is sent to the NVM 110, some of the fifth data becomes the fourth data. Correspondingly, some of the fifth regions 1530 become the fourth regions 1510, and the FTL wave front 1545 moves forward.

Accordingly, in response to determining resumption, a new checkpoint, the FTL wave tail 1550 is established at the end of the discarded region, which is the FTL wave front 1440. Programming can resume by copying the fourth data to the NVM 110.

Accordingly, in response to detecting the imminent interruption to the operations of the storage device 100, the controller 105 discards to-be-discarded metadata for data that is being copied to the NVM 110 after a checkpoint. The to-be-discarded metadata includes the first metadata and the additionally discarded metadata in the status of copy operations 1400 and the status of copy operations 1500. The checkpoint is the FTL wave front 1440. As shown, the checkpoint is immediately after a last block of additional data in the queue. The checkpoint is between all of the additional data and the third data.

It should also be noted that the arrangements disclosed herein can be implemented with or without compression. In the example in which the storage device 100 supports compression, there the amount of data to be buffered may be variable. Due to of the variable amount of data buffered, it may not coincide with a convenient physical boundary (e.g., an ECC page, NAND page, or so on). It should be noted that FIGS. 11, 12, 14, and 15 show uniform-sized regions for clarity, in case of compressed data, the regions may have different sizes.

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical drive storage, magnetic drive storage or other magnetic storages, or any other medium that may be used to store desired program code in the form of instructions or data structures and that may be accessed by a computer. Drive and disc, as used herein, includes compact disc (CD), laser disc, optical disc, digital versatile disc (DVD), floppy drive, and blu-ray disc where drives usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A non-transitory computer-readable medium comprising computer readable instructions, such that when executed by at least one processor of a storage device, causes the processor to:
   determine metadata for data;
   queue the metadata in an atomic list;
   in response to determining that atomic commit has occurred, move the metadata from the atomic list to write lookup lists based on logical information of the data; and
   determine one of metadata pages for each of the write lookup lists based on the logical information.

2. The non-transitory computer-readable medium of claim 1, wherein
   the metadata comprises mapping information that maps the logical information to physical locations of a non-volatile memory of the storage device; and
   the data is stored in the physical locations of the non-volatile memory.

3. The non-transitory computer-readable medium of claim 2, wherein determining the metadata comprises determining the physical locations using the logical information based on a Logical-to-Physical (L2P) mapping table.

4. The non-transitory computer-readable medium of claim 1, wherein the processor is further caused to:
receive an atomic write command and the data associated with the atomic write command from a host; and
determine whether the atomic commit has occurred.

5. The non-transitory computer-readable medium of claim 1, wherein the processor is further caused to:
determine groups of the metadata using the logical information; and
move each group of the metadata to a corresponding one of the write lookup lists.

6. The non-transitory computer-readable medium of claim 5, wherein the processor is further caused to move each group of the metadata from the one of the write lookup lists to a corresponding one of write cache lists, each of the write cache lists corresponds to one of metadata pages.

7. The non-transitory computer-readable medium of claim 6, wherein the processor is further caused to move each group of the metadata from each of the write cache lists to the corresponding one of the metadata pages.

8. The non-transitory computer-readable medium of claim 6, wherein the atomic list, the write lookup lists, and the write cache lists are stored in an in-memory journal.

9. The non-transitory computer-readable medium of claim 6, wherein the atomic commit has been completed after all of the metadata is moved to the metadata pages.

10. The non-transitory computer-readable medium of claim 1, wherein determining the one of metadata pages for each of the write lookup lists based on the logical information comprises performing one lookup operation to determine the one of the metadata pages using the logical information of the metadata in each of the write lookup lists.

11. A storage device, comprising:
a non-volatile memory comprising data pages and metadata pages; and
a controller configured to:
determine metadata for data;
queue the metadata in an atomic list;
in response to determining that atomic commit has occurred, move the metadata from the atomic list to write lookup lists based on logical information of the data; and
determine one of the metadata pages for each of the write lookup lists based on the logical information.

12. The storage device of claim 11, wherein
the metadata comprises mapping information that maps the logical information to physical locations of the data pages of the non-volatile memory of the storage device; and
the data is stored in the physical locations of the data pages.

13. The storage device of claim 11, wherein the controller is further configured to:
determine groups of the metadata using the logical information; and
move each group of the metadata to a corresponding one of the write lookup lists.

14. The storage device of claim 13, wherein the controller is further configured to move each group of the metadata from the one of the write lookup lists to a corresponding one of write cache lists, each of the write cache lists corresponds to one of metadata pages.

15. The storage device of claim 14, wherein the controller is further configured to move each group of the metadata from each of the write cache lists to the corresponding one of the metadata pages.

16. The storage device of claim 14, wherein the atomic list, the write lookup lists, and the write cache lists are stored in an in-memory journal.

17. The storage device of claim 14, wherein the atomic commit has been completed after all of the metadata is moved to the metadata pages.

18. The storage device of claim 11, wherein determining the one of metadata pages for each of the write lookup lists based on the logical information comprises performing one lookup operation to determine the one of the metadata pages using the logical information of the metadata in each of the write lookup lists.

19. A method, comprising:
determining metadata for data;
queuing the metadata in an atomic list;
in response to determining that atomic commit has occurred, moving the metadata from the atomic list to write lookup lists based on logical information of the data; and
determining one of metadata pages of a non-volatile memory for each of the write lookup lists based on the logical information.

20. The method of claim 19, wherein
the metadata comprises mapping information that maps the logical information to physical locations of a non-volatile memory of the storage device; and
the data is stored in the physical locations of the non-volatile memory.

* * * * *